US012588087B2

(12) United States Patent
Wei et al.

(10) Patent No.: US 12,588,087 B2
(45) Date of Patent: Mar. 24, 2026

(54) REDUCED CAPABILITY USER EQUIPMENT IDENTIFICATION FOR SIDELINK COMMUNICATIONS

(71) Applicant: QUALCOMM Incorporated, San Diego, CA (US)

(72) Inventors: Chao Wei, Beijing (CN); Jing Dai, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 18/265,409

(22) PCT Filed: Feb. 11, 2021

(86) PCT No.: PCT/CN2021/076611
§ 371 (c)(1),
(2) Date: Jun. 5, 2023

(87) PCT Pub. No.: WO2022/170610
PCT Pub. Date: Aug. 18, 2022

(65) Prior Publication Data
US 2024/0114569 A1      Apr. 4, 2024

(51) Int. Cl.
*H04W 76/14*          (2018.01)
*H04L 1/1812*          (2023.01)
(Continued)

(52) U.S. Cl.
CPC ........... *H04W 76/14* (2018.02); *H04L 1/1812* (2013.01); *H04W 8/005* (2013.01); *H04W 8/22* (2013.01);
(Continued)

(58) Field of Classification Search
CPC ..... H04W 76/14; H04W 72/25; H04W 72/12; H04W 8/005; H04W 8/22; H04W 56/0015; H04L 1/1812
See application file for complete search history.

(56) References Cited

U.S. PATENT DOCUMENTS

2019/0150031 A1     5/2019   Balasubramanian et al.
2019/0363843 A1    11/2019   Gordaychik
(Continued)

FOREIGN PATENT DOCUMENTS

CN          111052855  A      4/2020
EP             3681247  A1 *   7/2020    ............ H04W 76/14
(Continued)

OTHER PUBLICATIONS

Ericsson: "Study on Support of Reduced Capability NR Devices", 3GPP TSG RAN meeting #90e, RP-202703, Dec. 11, 2020 (Dec. 11, 2020), 35 Pages, pp. 33-34.
(Continued)

*Primary Examiner* — Saad A. Waqas
(74) *Attorney, Agent, or Firm* — QUALCOMM Incorporated

(57)          ABSTRACT
Example aspects include an apparatus and method of wireless communication by a reduced capability user equipment (RedCap UE) in a network, comprising sending, to a non-RedCap UE, an indication indicating the RedCap UE as a RedCap UE device. The aspects further include performing sidelink communications with the non-RedCap UE in accordance with capabilities of the RedCap UE.

28 Claims, 16 Drawing Sheets

1400

(51) Int. Cl.

| | | |
|---|---|---|
| *H04W 8/00* | (2009.01) | |
| *H04W 8/22* | (2009.01) | |
| *H04W 56/00* | (2009.01) | |
| *H04W 72/12* | (2023.01) | |
| *H04W 72/25* | (2023.01) | |

(52) U.S. Cl.
CPC ....... *H04W 56/0015* (2013.01); *H04W 72/12* (2013.01); *H04W 72/25* (2023.01)

(56) References Cited

U.S. PATENT DOCUMENTS

| | | | |
|---|---|---|---|
| 2020/0196255 A1 * | 6/2020 | Cheng | ................... H04L 5/0048 |
| 2020/0404600 A1 | 12/2020 | Ly et al. | |

FOREIGN PATENT DOCUMENTS

| | | | | |
|---|---|---|---|---|
| WO | 2015071025 A1 | 5/2015 | | |
| WO | 2018058583 A1 | 4/2018 | | |
| WO | 2019195456 | 10/2019 | | |
| WO | WO-2020197279 A1 * | 10/2020 | ............ | H04W 72/51 |
| WO | WO-2020204494 A1 * | 10/2020 | ............ | H04W 72/20 |

OTHER PUBLICATIONS

Intel Corporation: "Summary of discussion [109][Redcap] Reduced capability signalling framework (Intel)", 3GPP TSG-RAN WG2 Meeting #111 electronic, R2-2008191, Aug. 28, 2020 (Aug. 28, 2020), 27 Pages, pp. 8-12, 17-18.

International Search Report and Written Opinion—PCT/CN2021/076611—ISA/EPO—Nov. 19, 2021.

Qualcomm Incorporated: "Complexity Reduction for RedCap Devices", 3GPP TSG-RAN WG1 Meeting #104, R1-2101766, 3GPP, Mobile Competence Centre, 650, Route Des Lucioles, F-06921 Sophia-Antipolis Cedex, France, vol. RAN WG1, No. e-Meeting, Jan. 25, 2021-Feb. 5, 2021, 13 Pages, Feb. 5, 2021, XP051975869, clause 2.1 with reference to Fig. 2, section 4.1, section 2.2.1 and 2.3, figures 1,2.

Qualcomm Incorporated: "Higher Layer Support for RedCap Devices", 3GPP TSG-RAN WG1 Meeting #104 e-Meeting, R1-2101472, Feb. 5, 2021 (Feb. 5, 2021), 3 Pages, sections 2-3.

Supplementary European Search Report—EP21925271—Search Authority—The Hague—Oct. 15, 2024.

* cited by examiner

600

700

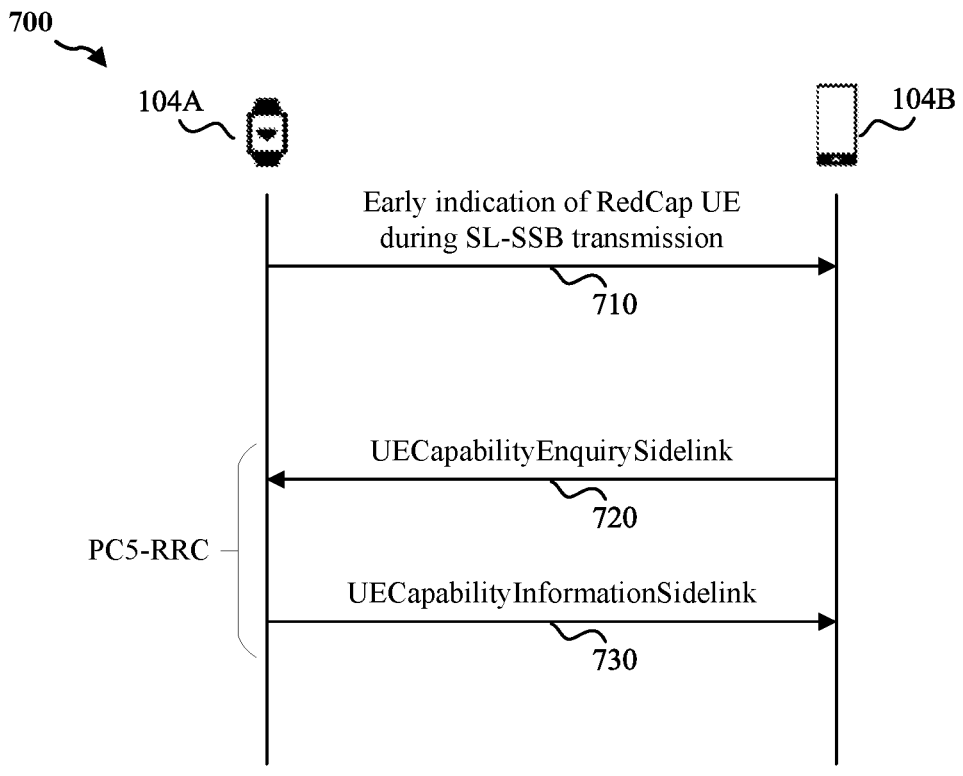

104A

104B

Early indication of RedCap UE
during SL-SSB transmission

710

UECapabilityEnquirySidelink

720

PC5-RRC

UECapabilityInformationSidelink

| PSBCH Contents | Number of bits | Notes |
|---|---|---|
| DFN | 10 | |
| Indication of TDD Configuration | 12 | System-wide information, e.g., TDD-UL-DL common configuration and/or potential SL slots |
| Slot Index | 7 | |
| In-Coverage Indicator | 1 | |
| Reserved Bits | 2 | Re-interpreted to indicate RedCap UE type |
| CRC | 24 | |
| Total Bits | 56 | |

| RedCap UE Type | Sequence Cyclic Shift |
|---|---|
| 1 MIMO Layer | 0 |
| 2 MIMO Layers | 6 |

1320

| RedCap UE Type | | Sequence Cyclic Shift |
|---|---|---|
| MIMO Layers | Maximum Bandwidth | |
| 1 Layer | 20 MHz | 0 |
| 1 Layer | 40 MHz | 3 |
| 2 Layers | 20 MHz | 6 |
| 2 Layers | 40 MHz | 9 |

1330

| RedCap UE Type | HARQ Feedback | Sequence Cyclic Shift |
|---|---|---|
| 1 MIMO Layer | ACK | 0 |
| 1 MIMO Layer | NACK | 6 |
| 2 MIMO Layers | ACK | 3 |
| 2 MIMO Layers | NACK | 9 |

Sending, to a second UE, an indication indicating a UE type for sidelink communication    1602

Performing sidelink communications with the second UE in accordance with the indicated UE type    1604

1600

Receiving, from the second UE, a UE capability request    1702

Sending, to the second UE in response to the UE capability request, UE capability information indicating at least one reduced capability of the first UE    1704

1600

Receiving, from the second UE via a physical sidelink shared channel (PSSCH), a data communication     1802

Sending, via a physical sidelink feedback channel (PSFCH), the indication indicating the UE type for the sidelink communication     1804

1600

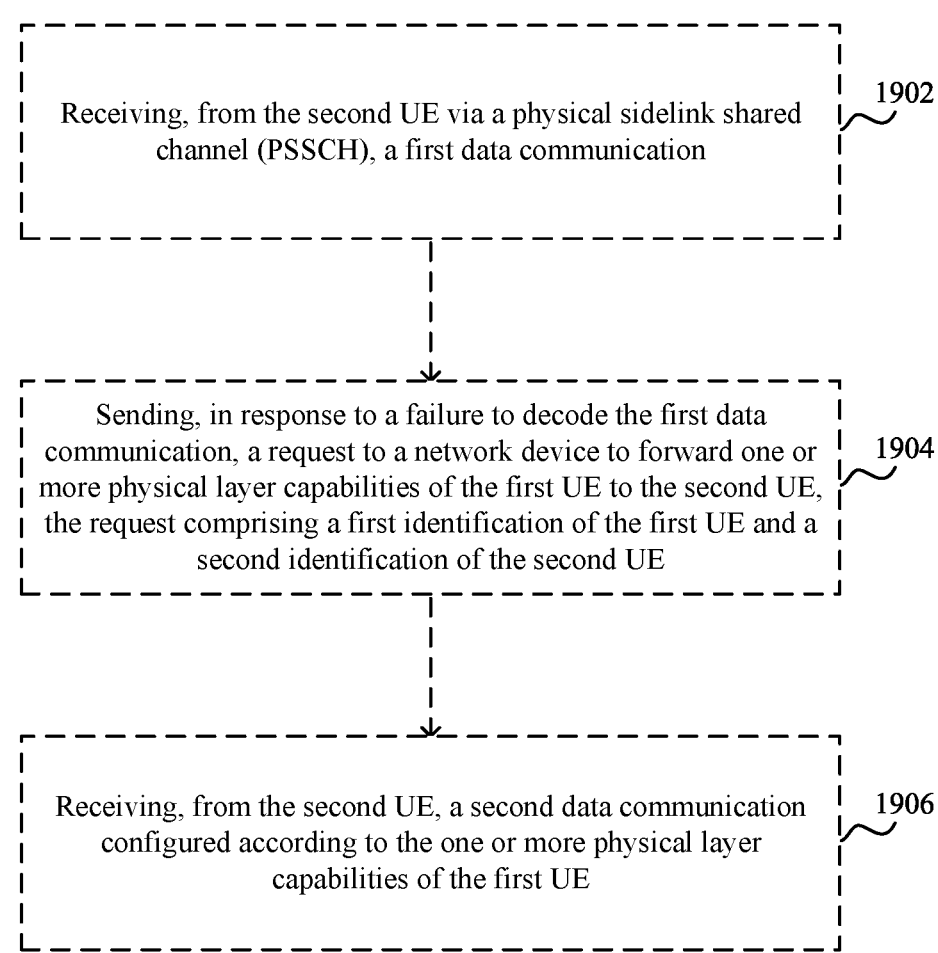

Receiving, from the second UE via a physical sidelink shared channel (PSSCH), a first data communication    1902

Sending, in response to a failure to decode the first data communication, a request to a network device to forward one or more physical layer capabilities of the first UE to the second UE, the request comprising a first identification of the first UE and a second identification of the second UE    1904

Receiving, from the second UE, a second data communication configured according to the one or more physical layer capabilities of the first UE    1906

FIG. 19

REDUCED CAPABILITY USER EQUIPMENT IDENTIFICATION FOR SIDELINK COMMUNICATIONS

CROSS-REFERENCE TO RELATED APPLICATIONS

This application is a 35 U.S.C. § 371 National Phase Application of PCT Application No. PCT/CN2021/076611 filed Feb. 11, 2021, entitled "REDUCED CAPABILITY USER EQUIPMENT IDENTIFICATION FOR SIDELINK COMMUNICATIONS," which is assigned to the assignee hereof and hereby incorporated by reference herein.

BACKGROUND

Technical Field

The described aspects relate generally to wireless communication systems, and more particularly, to providing a reduced capability user equipment (RedCap UE) identification for sidelink communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in sidelink, vehicle-to-vehicle (V2V), vehicle-to-everything (V2X), and/or device-to-device (D2D) communication. There exists a need for further improvements in sidelink, V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication by a first user equipment (UE), comprising sending, to a second UE, an indication indicating a UE type for sidelink communication. The method further includes performing sidelink communications with the second UE in accordance with the indicated UE type.

Another example aspect includes an apparatus for wireless communication by a first user equipment (UE), comprising a memory and a processor communicatively coupled with the memory. The processor is configured to send, to a second UE, an indication indicating a UE type for sidelink communication. The processor is further configured to perform sidelink communications with the second UE in accordance with the indicated UE type.

Another example aspect includes an apparatus for wireless communication by a first user equipment (UE), comprising means for sending, to a second UE, an indication indicating a UE type for sidelink communication. The apparatus further includes means for performing sidelink communications with the second UE in accordance with the indicated UE type.

Another example aspect includes a non-transitory computer-readable medium comprising stored instructions for wireless communication by a first user equipment (UE), executable by a processor to send, to a second UE, an indication indicating a UE type for sidelink communication. The instructions are further executable to perform sidelink communications with the second UE in accordance with the indicated UE type.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a diagram illustrating a first message flow between a RedCap UE and a non-RedCap UE, in accordance with various aspects of the present disclosure.

FIG. 8 is a diagram illustrating an example of PSBCH contents, in accordance with various aspects of the present disclosure.

FIG. 13 illustrates mapping relationships between Red-Cap UE type indications and sequence cyclic shift values, in accordance with various aspects of the present disclosure.

FIG. 19 is a flowchart of third additional or optional steps for a method of wireless communication to be performed by a UE in accordance with various aspects of the present disclosure.

DETAILED DESCRIPTION

Figure 1:
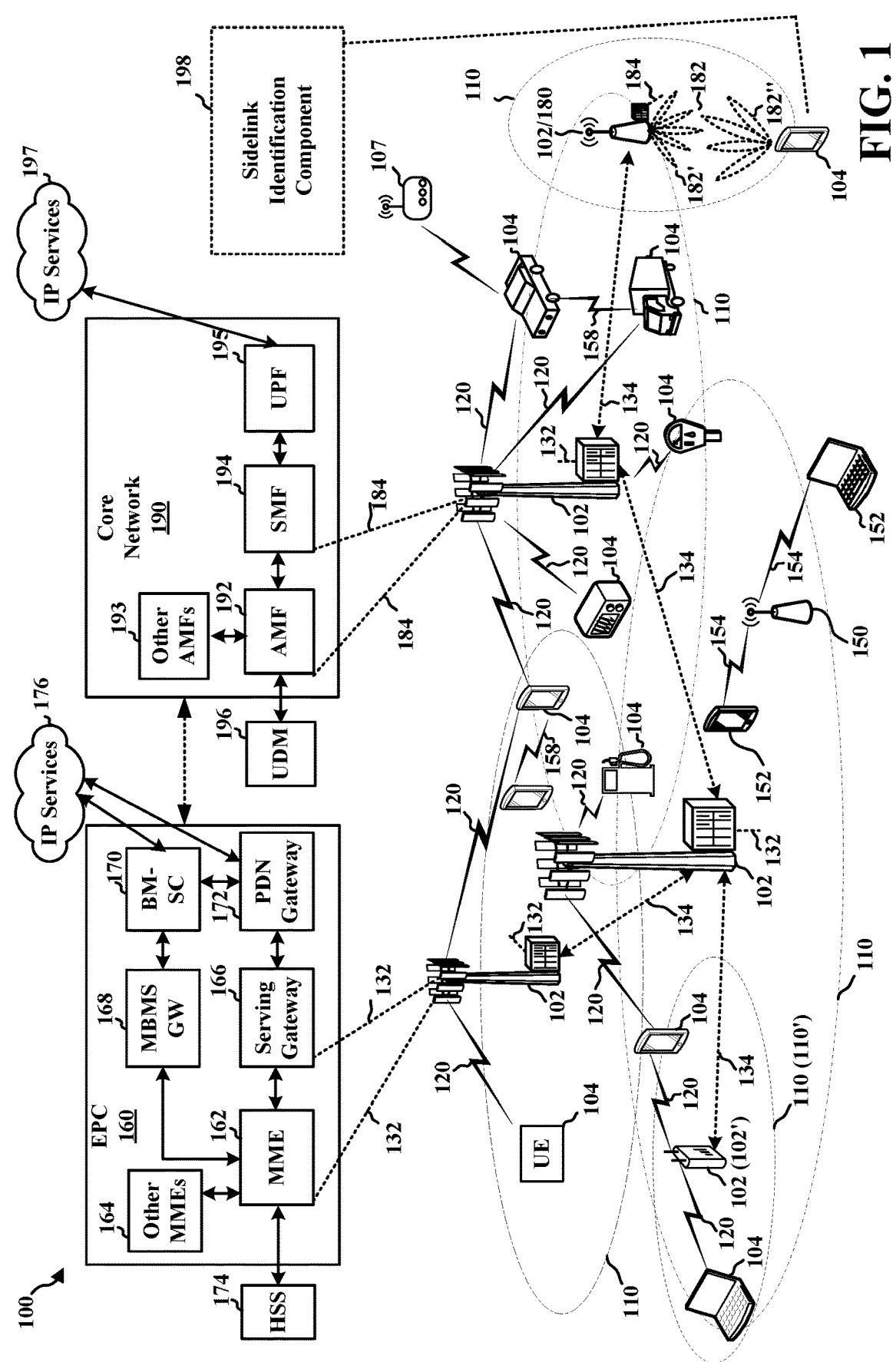
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A user equipment (UE) in a wireless communications system may comprise a reduced capability (RedCap) UE device. In some aspects, a RedCap UE may have reduced capabilities, reduced complexity, and/or reduced cost when compared to a conventional, or non-RedCap, UE. For example, reduced capabilities of RedCap UE devices may include, but not be limited to, smaller bandwidth capabilities, reduced number of receive antennas, relaxed processing requirements, and less frequent monitoring of control channels, when compared to a non-RedCap UE device. RedCap UE devices may be intended for devices such as wearable devices (e.g., smart watches, rings, etc.), industrial wireless sensors, and/or surveillance cameras. That is, RedCap UE devices may be utilized in applications requiring extended battery lifetimes and/or infrequent transmission of small amounts of data.

A non-RedCap UE in the wireless communication system may perform sidelink, vehicle-to-vehicle (V2V), vehicle-to-everything (V2X), and/or device-to-device (D2D) communications with a RedCap UE. The RedCap UE may have lower capabilities (e.g., bandwidth capability) than the non-RedCap UE. If or when the non-RedCap UE communicates with the RedCap UE based on parameters associated with the non-RedCap UE, the RedCap UE may be unable to transmit and/or receive information properly. As such, the non-RedCap UE may require an identification of the Red-Cap UE type in order to properly configure sidelink transmission resources. However, conventional communication systems do not provide for the RedCap UE to indicate, to the non-RedCap UE, an indication of the RedCap UE type. In such conventional systems, the non-RedCap UE may be unable to perform sidelink communication with the RedCap UE.

Aspects presented herein provide for multiple manners for a RedCap UE to indicate to a non-RedCap UE an indication of the RedCap UE type. Such an indication may allow the non-RedCap UE to configure proper transmission parameters to perform the sidelink communication. Further, aspects presented herein may reduce complexity and latency of the wireless communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may include a sidelink identification component 198 configured to send an indication indicating a UE type for sidelink communication, and to perform sidelink communications in accordance with the indicated UE type.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF)

band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on sidelink, V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on sidelink/V2V/V2X/V2I or other D2D communication, such as Proximity Services (ProSe), etc. Communication based on sidelink, V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 3.

Although the following description may provide examples for sidelink/V2X/D2D communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station

102, UE 104) of the wireless communications system and the access network 100 described above in FIG. 1. The resources may be time-based, frequency-based, or both on time and frequency.

Figures 2A, 2B, 2C, 2D:
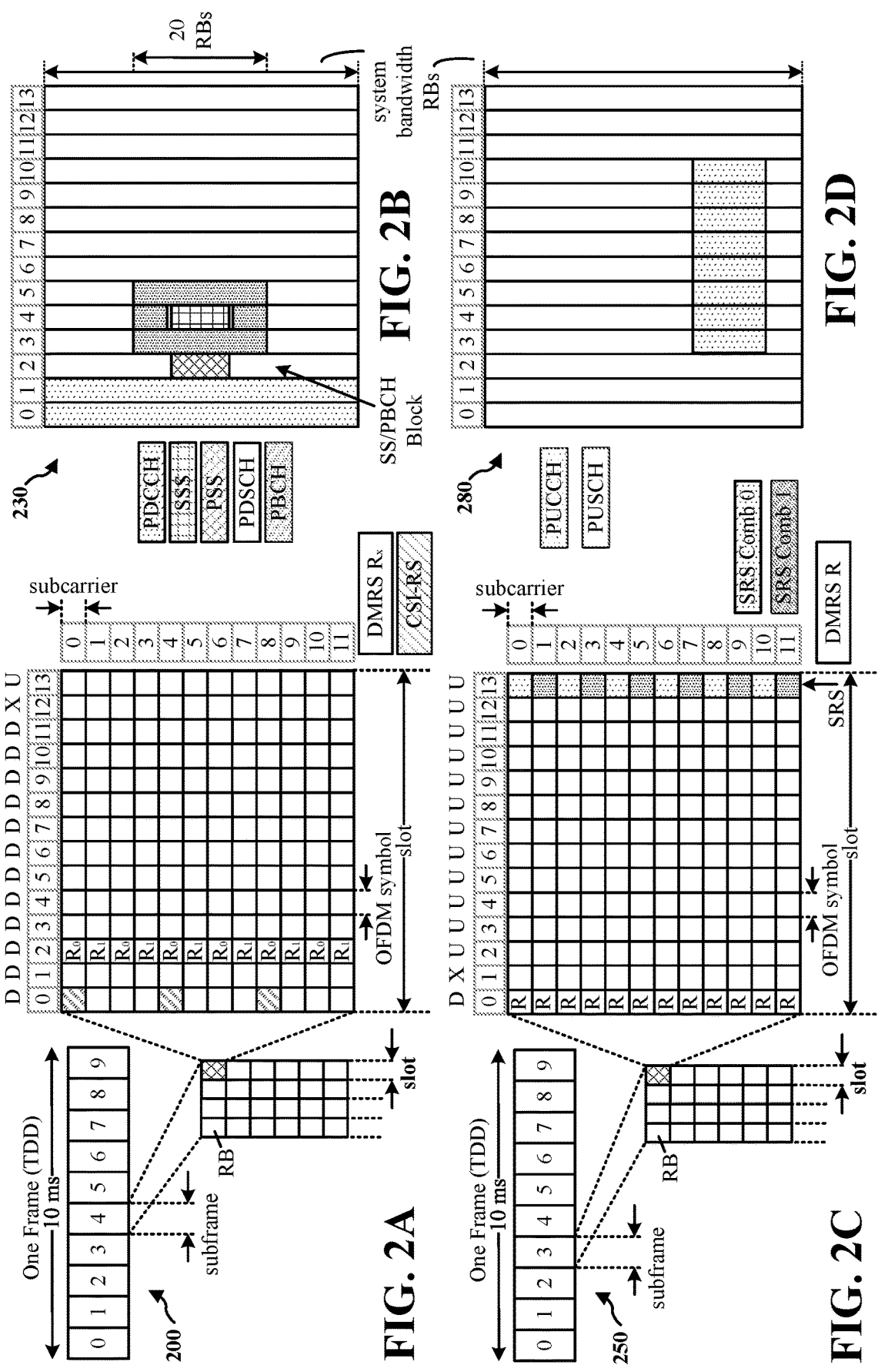
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
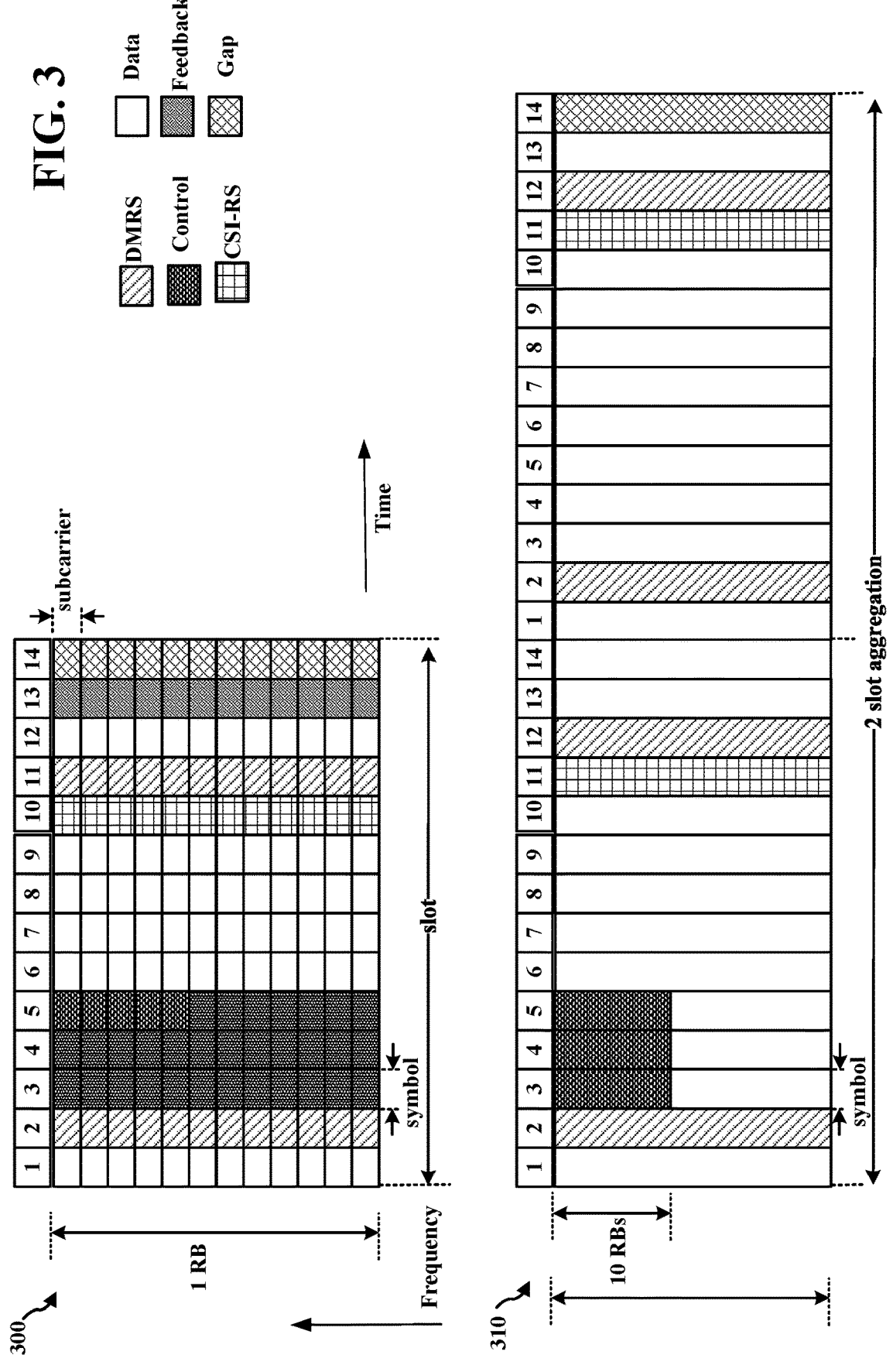
FIG. 3 illustrates example aspects of a sidelink slot structure, in accordance with various aspects of the present disclosure.

FIG. 3 illustrates example diagrams 300 and 310 illustrating examples slot structures that may be used for wireless communication between UE 104A and UE 104B, e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 millisecond transmission time interval (TTI). Diagram 310 illustrates an example two-slot aggregation, e.g., an aggregation of two 0.5 millisecond TTIs. Diagram 300 illustrates a single resource block (RB), whereas diagram 310 illustrates N RBs. In diagram 310, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may comprise control information, e.g., along with demodulation RS (DMRS). FIG. 3 also illustrates that symbol(s) may comprise CSI-RS. The symbols in FIG. 3 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. Multiple slots may be aggregated together. FIG. 3 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 4:
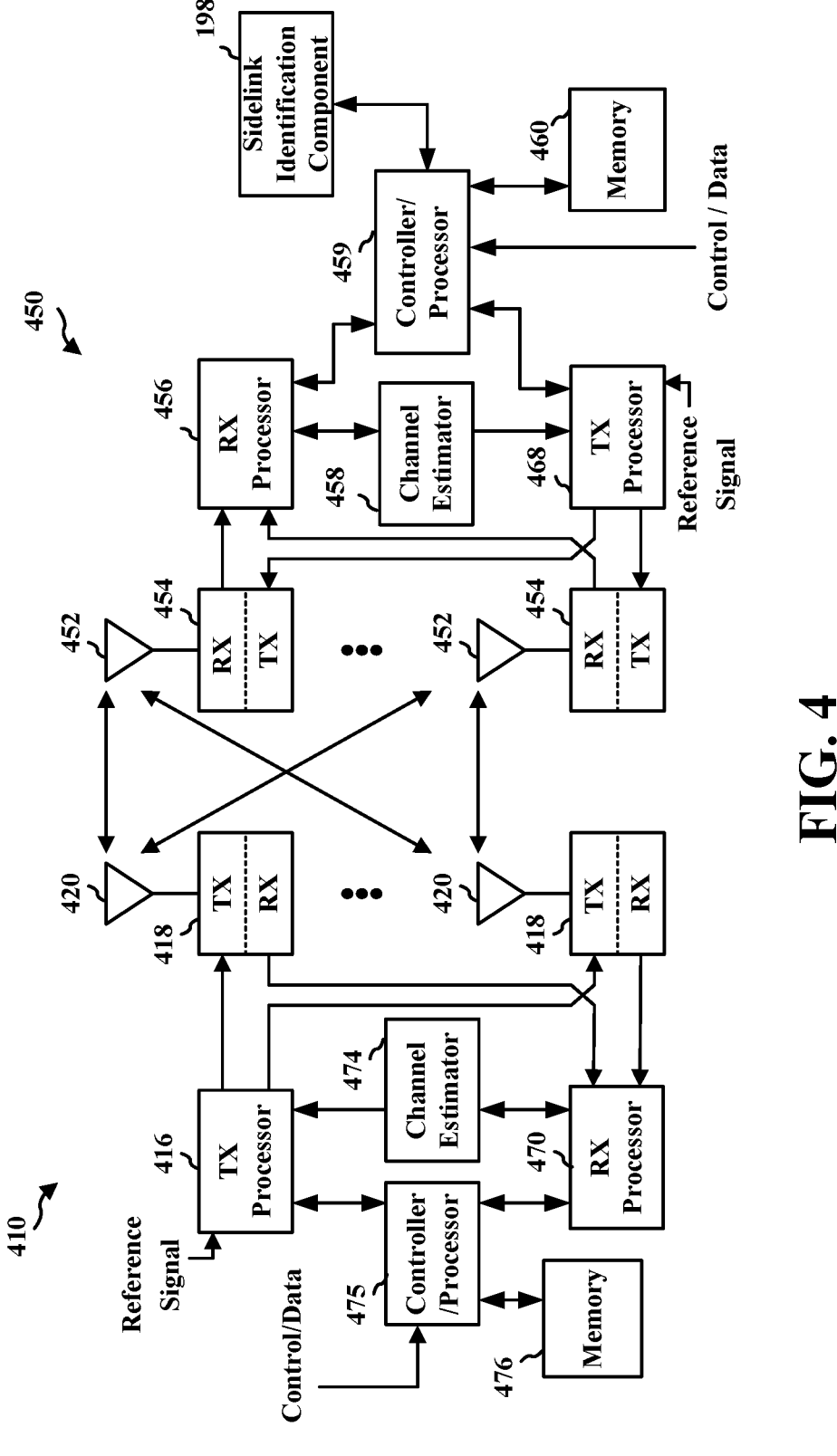
FIG. 4 is a diagram illustrating an example of hardware components of the base station and the user equipment (UE) in the access network, in accordance with various aspects of the present disclosure.

FIG. 4 is a block diagram 400 of a first wireless communication device 410 in communication with a second wireless communication device 450, e.g., via sidelink/V2V/V2X/D2D communication. The device 410 may comprise a transmitting device communicating with a receiving device, e.g., device 450, via sidelink/V2V/V2X/D2D communication. The communication may be based, e.g., on sidelink. The transmitting device 410 may comprise a non-RedCap UE, an RSU, etc. The receiving device may comprise a RedCap UE, an RSU, etc. Packets may be provided to a controller/processor 475 that may implement Layer 3 and Layer 2 functionality. Layer 3 may include a radio resource control (RRC) layer, and Layer 2 may include a packet data convergence protocol (PDCP) layer, a radio link control (RLC) layer, and a medium access control (MAC) layer.

The transmit (TX) processor 416 and the receive (RX) processor 470 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the device 450, each receiver 454RX may receive a signal through its respective antenna 452. Each receiver 454RX may recover information modulated onto an RF carrier and may provide the information to the receive (RX) processor 456. The TX processor 468 and the RX processor 456 may implement Layer 1 functionality associated with various signal processing functions. The RX processor 456 may perform spatial processing on the information to recover any spatial streams destined for the device 450. If or when multiple spatial streams are destined for the device 450, the multiple spatial streams may be combined by the RX processor 456 into a single OFDM symbol stream. The RX processor 456 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by device 410. These soft decisions may be based on channel estimates computed by the channel estimator 458. The soft decisions may then be decoded and deinterleaved to recover the data and control signals that were originally transmitted by device 410 on the physical channel. The data and control signals may then be provided to the controller/processor 459, which may implement Layer 3 and Layer 2 functionality.

The controller/processor 459 can be associated with a memory 460 that stores program codes and data. The memory 460 may be referred to as a computer-readable medium. The controller/processor 459 may provide demultiplexing between transport and logical channels, packet reassembly, deciphering, header decompression, and control signal processing. The controller/processor 459 is also responsible for error detection using an ACK and/or NACK protocol to support HARQ operations.

Similar to the functionality described in connection with the transmission by device 410, the controller/processor 459 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The transmission may be processed at the device 410 in a manner similar to that described in connection with the receiver function at the device 450. Each receiver 418RX may receive a signal through its respective antenna 420. Each receiver 418RX may recover information modulated onto an RF carrier and may provide the information to a RX processor 470.

The controller/processor 475 can be associated with a memory 476 that stores program codes and data. The memory 476 may be referred to as a computer-readable medium. The controller/processor 475 may provide demultiplexing between transport and logical channels, packet reassembly, deciphering, header decompression, control signal processing. The controller/processor 475 may also be responsible for error detection using an ACK and/or NACK protocol to support HARQ operations.

At the UE 450, at least one of the TX processor 468, the RX processor 456, and the controller/processor 459 may be configured to perform aspects in connection with the sidelink identification component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

In some aspects, there may be use cases in a wireless communication system that do not require a UE to achieve peak capabilities (e.g., eMBB, URLLC). As such, it may be desirable for the UE to be scalable and/or deployable in efficient and/or cost-effective ways. For example, the peak throughput, latency, and/or reliability requirements for the UE may be relaxed in exchange for efficiency (e.g. power consumption and system overhead) and/or cost reduction. Examples of such UEs (e.g., RedCap UEs, also known as New Radio (NR)-Light UEs) may include wearables (e.g., smart watches), industrial wireless sensor network (IWSN) devices, security devices (e.g., surveillance cameras), and the like. Reduced capabilities of RedCap UEs may include, but not be limited to, smaller bandwidth capabilities, reduced number of receive antennas, relaxed processing requirements, and less frequent monitoring of control channels, when compared to a non-RedCap UE device.

Wireless communication devices (e.g., UE 104A, UE 104B) in a wireless communication system may perform communications based on NR sidelink (e.g., V2V, V2X, direct D2D link). NR sidelink communications may support at least of one following types of operations: broadcast, groupcast, and unicast operations. Broadcast operations may comprise data transmissions from a first device to all devices. Groupcast operations may comprise data transmissions from the first device to a group (e.g. groupcast group) composed of a plurality of devices. Unicast operations may comprise data transmissions from the first device to a second device. During unicast operations, the first device and the second device may establish a communication link between the two devices. For example, the communication link may comprise a NR sidelink communication link.

NR sidelink communications may utilize resources from transmission and/or reception resource pools allocated for sidelink communications. The resource pools may have been allocated by a network device (e.g., gNB). In some aspects, a minimum resource allocation unit may comprise one sub-channel in a frequency domain and one slot in a time domain. A sub-channel may include a number of contiguous RBs (e.g., 10, 15, 20, 25, 50, 75, 100 PRBs). The size of the sub-channel may be configured by a higher layer.

In some aspects, the PSCCH and the PSSCH may be transmitted within a same sidelink slot. For example, the PSCCH may be configured to span a predetermined number of PRBs (e.g., 10, 12, 15, 20, 25) and may be limited to a single sub-channel. Alternatively or additionally, the PSSCH may be configured to span one or more sub-channels based on a SCI formation transmitted in the PSCCH. PSSCH transmissions may comprise one- or two-layer transmissions and may support various modulation schemes, such as, QPSK, 16-QAM, 64-QAM, and 256-QAM. In other aspects, a physical sidelink feedback channel (PSFCH) may be further transmitted in the sidelink slot. The PSFCH may comprise two OFDM symbols. For example, a first OFDM symbol of the PSFCH may be a repetition of the second OFDM symbol of the PSFCH. Such a scenario may facilitate an automatic gain control (AGC) setting. Alternatively or additionally, a gap symbol may be transmitted after the PSFCH symbols.

Sidelink communications may be configured with multiple transmit resource pools and/or multiple receive resource pools. Each resource pool may define a subset of available subframes and/or resource blocks for either sidelink transmission or reception. Alternatively or additionally, each resource pool may define a PSCCH configuration, a PSSCH configuration, a PSFCH configuration, a quantity of sub-channels, a sub-channel size, a start resource block, a sensing configuration, a power control configuration, and the like.

The sidelink resource pools may be configured statically/semi-statically (e.g., using Layer 3 messaging). In some aspects, if or when a UE device determines that data is to be sent using sidelink communications, the UE may dynamically select one or more transmission resources from within a transmission resource pool. For example, the UE may determine the one or more transmission resources based at least on a transmission mode configuration. That is, in a first transmission mode, the UE may determine the one or more transmission resources according to an indication received from a network device (e.g., gNB). Alternatively or additionally, the UE may, in a second transmission mode, determine the one or more transmission resources according to a predetermined rule.

Figure 5:
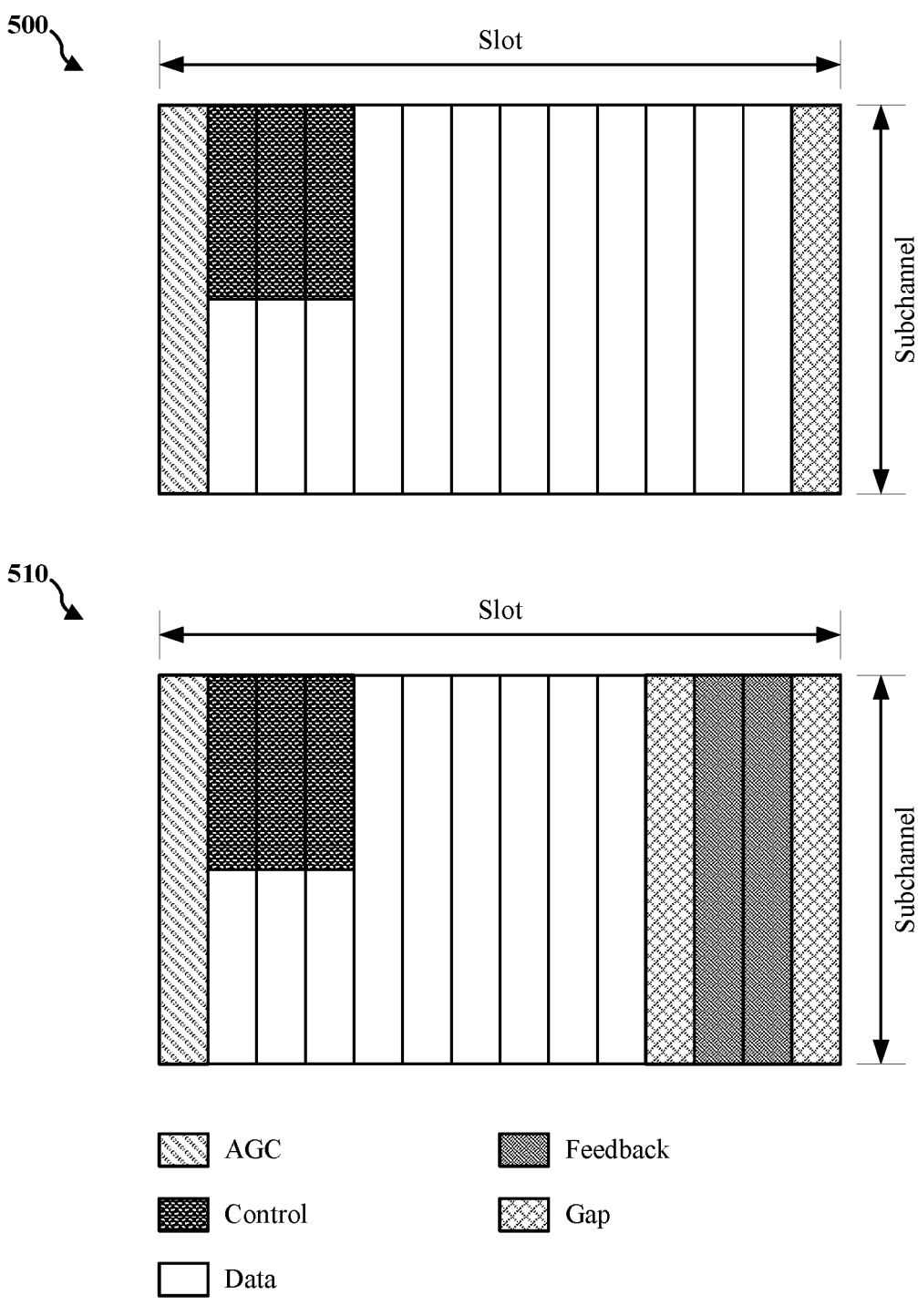
FIG. 5 is a diagram illustrating other example aspects of a sidelink slot structure, in accordance with various aspects of the present disclosure.

Referring to FIG. 5, diagrams 500 and 510 illustrate examples of different slot structures that may be used for sidelink communications between network elements (e.g., UE 104A, UE 104B). The slot structures depicted in FIG. 5 are similar in many respects to the slot structures described above with reference to FIG. 3 and may include additional features not mentioned above. Diagrams 500 and 510 illustrate example of various sidelink channels within a subframe of a frame.

For example, as shown in diagram 500, the first symbol in the slot may be allocated for automatic gain control (AGC). In some aspects, the first two symbols in the slot (not shown) may be allocated for AGC. The PSCCH may carry control information, such as SCI, and the associated PSSCH may carry sidelink data. The last symbol in the slot may be used as a gap. The gap may enable a device to switch from operating as a transmitting device to prepare to operate as a receiving device, e.g., in the following slot.

Alternatively or additionally, the sidelink slot structure may comprise a PSFCH, as shown in diagram 510. The PSFCH may carry HARQ feedback information (e.g., ACK/NACK feedback).

In some aspects, a RedCap UE may have reduced capabilities compared to a non-RedCap UE. For example, a RedCap UE may operate on a narrow bandwidth (e.g., 20

MHz or optional 40 MHz for FR1, 100 MHz for FR2). In another example, a RedCap UE may have a reduced number of receive branches or antennas (e.g., one or two). In yet another example, the RedCap UE may have a reduced number of MIMO spatial layers (e.g., one or two) and/or a reduced maximum modulation order (e.g., 64-QAM). As such, a non-RedCap UE attempting to communicate with a RedCap UE using sidelink communications may require an indication of a UE type (e.g., RedCap UE, non-RedCap UE) in order to configure proper PSSCH transmission parameters. For example, the scheduled bandwidth for PSSCH transmission should not exceed a maximum UE bandwidth capability associated with the indicated UE type (e.g., 20 MHz or optional 40 MHz for FR1 and 100 MHz for FR2 for a RedCap UE). In another example, the number of MIMO spatial layers for PSSCH transmission should not exceed a maximum number of MIMO spatial layers supported by the indicated UE type (e.g., one or two for a RedCap UE). In yet another example, the assigned PSSCH resources should be within a frequency range associated with the indicated UE type. That is, the assigned PSSCH resources should be within narrow bandwidth resources for a RedCap UE.

Figure 6:
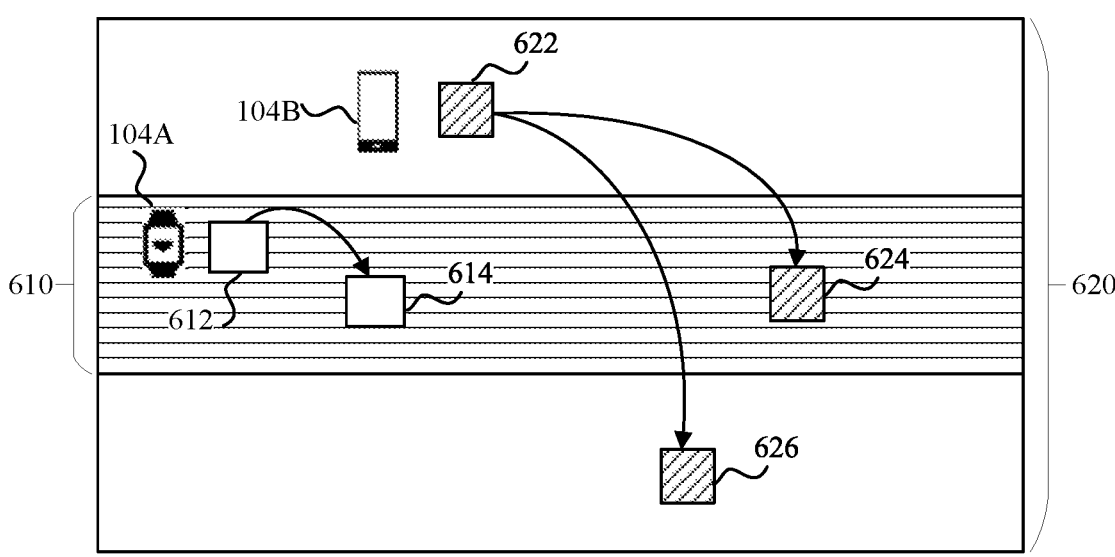
FIG. 6 is a diagram illustrating an example of narrowband and wideband bandwidth resources, in accordance with various aspects of the present disclosure.

For example, as shown in FIG. 6, a RedCap UE 104 may operate within a narrow resource bandwidth 610. That is, the RedCap UE 104A may assign and/or utilize transmission resources 612-614 (e.g., PSSCH) that fall within the narrow resource bandwidth 610. Alternatively or additionally, a non-RedCap UE 104B may operate within a wideband resource bandwidth 620. That is, the non-RedCap UE 104B may assign and/or utilize transmission resources 622-626 (e.g., PSSCH) that fall within the wideband resource bandwidth 620. As such, the non-RedCap UE 104B may not be able to perform sidelink communications with the RedCap UE 104A utilizing transmission resources that fall outside the narrow resource bandwidth 620 (e.g., 622 and 626). Instead, the non-RedCap UE 104B may need to utilize transmission resources (e.g., 624) that fall within the narrow resource bandwidth 620 in order to perform sidelink communications with the RedCap UE 104A. Thus, there exists a need for the RedCap UE 104A to indicate, to the non-RedCap UE 104B, an indication of the RedCap UE type. Such an indication may allow the non-RedCap UE 104B to configure proper transmission parameters to perform the sidelink communications with the RedCap UE 104A.

FIG. 7 is a diagram illustrating a first message flow comprising an indication of the RedCap UE type, between a RedCap UE and a non-RedCap UE. For example, the diagram 700 illustrates the message flow of the RedCap UE 104A indicating to the non-RedCap UE 104B an indication of the RedCap UE type. In step 710, the RedCap UE 104A may send an early indication of the RedCap UE type during sidelink SSB (SL-SSB) transmission. For example, the RedCap UE 104A may transmit a SL-SSB comprising the indication of the RedCap UE type. The indication of the RedCap UE type may be transmitted over a PSBCH. In some aspects, one or more reserved bits of a PSBCH payload may be reinterpreted as the indication of the Red-Cap UE type, as shown in FIG. 8. For example, the one or more reserved bits may indicate that the RedCap UE 104A is a RedCap UE.

Referring to FIG. 8, a PSBCH payload may comprise a direct frame number (DFN) field. For example, the DFN field may comprise 10 bits of the PSBCH payload. The PSBCH payload may further comprise an indication of TDD configuration. The indication may indicate system-wide information, such as TDD-UL-DL configuration, potential SL slots, and the like. For example, the indication may comprise 12 bits of the PSBCH payload. The PSBCH payload may further comprise a slot index field. The slot index field may comprise 7 bits of the PSBCH payload. The PSBCH payload may further comprise an in-coverage indicator field. For example, the in-coverage indicator field may comprise 1 bit of the PSBCH payload. The PSBCH payload may further comprise one or more reserved bits. For example, the PSBCH payload may comprise 2 reserved bits. In some aspects, the one or more reserved bits of a PSBCH payload may be reinterpreted as the indication of the RedCap UE type. The PSBCH payload may further comprise a cyclic redundancy check (CRC) field. The CRC field may comprise 24 bits of the PSBCH payload.

With further reference to FIG. 7, alternatively or additionally, the RedCap UE 104A and the non-RedCap UE 104B may perform PC5 (e.g., sidelink) RRC communications. The PC5-RRC communications may be performed to establish a PC5 (e.g., sidelink) link between the RedCap UE 104A and the non-RedCap UE 104B. The PC5-RRC communications may include capability negotiations between the RedCap UE 104A and the non-RedCap UE 104B, based at least in part on the early indication of the RedCap UE type. That is, the RedCap UE 104A may provide additional RedCap UE type and/or capability information to the non-RedCap UE 104B as part of the capability negotiations. In some aspects, the RedCap UE 104A and the non-RedCap UE 104B may reuse conventional PC5-RRC signaling to exchange capability information. In other aspects, the RedCap UE 104A and the non-RedCap UE 104B may add new fields to conventional PC5-RRC signaling to indicate the RedCap UE type and/or capability information.

In step 720, the non-RedCap UE 104B may request the RedCap UE 104A to provide capability information. That is, the non-RedCap UE 104B may send a UECapabilityEnquirySidelink message to the RedCap UE 104A requesting capability information. The RedCap UE 104A may respond to the request, in step 730, by reporting the capability information requested by the non-RedCap UE 104B. For example, the RedCap UE 104A may send a UECapabilityInformationSidelink message to the non-RedCap UE 104B providing the requested capability information. The reported capability information may comprise a maximum bandwidth information, a number of receive branches or antennas, a number of MIMO spatial layers, a maximum modulation order, and the like. The RedCap UE 104A and the non-RedCap UE 104B may establish a PC5 (e.g., sidelink) link according to the reported capability information.

Figure 9:
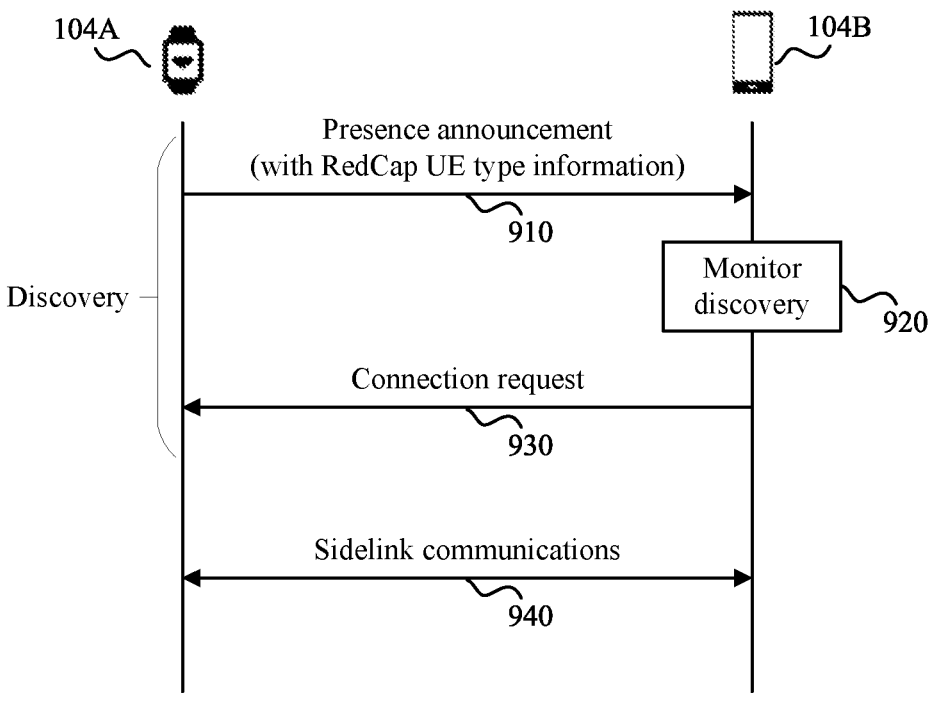
FIG. 9 is a diagram illustrating a second message flow between a RedCap UE and a non-RedCap UE, in accordance with various aspects of the present disclosure.

FIG. 9 is a diagram illustrating a second message flow comprising an indication of the RedCap UE type, between a RedCap UE and a non-RedCap UE. For example, the diagram 900 illustrates the message flow of the RedCap UE 104A indicating to the non-RedCap UE 104B an indication of the RedCap UE type during transmission of discovery signals. The indication of the RedCap UE type may comprise an indication that the RedCap UE 104A is a RedCap UE. Alternatively or additionally, the indication of the RedCap UE may comprise capability information of the RedCap UE 104A.

In step 910, the RedCap UE 104A may send a presence announcement. The RedCap UE 104A may transmit the presence announcement to neighboring devices of the RedCap UE 104A, as part of a discovery procedure, for example. The presence announcement may comprise an indication of the RedCap UE type information. In some aspects, the presence announcement may comprise a global synchronization signal (GSS) and/or a reference broadcast synchronization (RBS) signal. In other aspects, the presence announcement may be transmitted on the PSCCH or on the PSSCH.

The non-RedCap UE 104B may, in step 920, monitor for discovery signals transmitted by a neighboring device. That is, the non-RedCap UE 104B may monitor the PSCCH and/or the PSSCH for the presence announcement from the RedCap UE 104A. In step 930, the non-RedCap UE 104B may send a connection request to the RedCap UE 104A based at least on the indication of the RedCap UE type comprised by the presence announcement. For example, the non-RedCap UE 104B may determine to establish a sidelink communication link with the RedCap UE 104A at least according to the presence announcement and the indication of the RedCap UE type comprised therein. In step 940, the RedCap UE 104A and the non-RedCap UE 104B may perform sidelink communications using the sidelink communication link. For example, the RedCap UE 104A and the non-RedCap UE 104B may exchange data and/or control signal transmissions on one or more sidelink channels (e.g., PSCCH, PSSCH).

Figure 10:
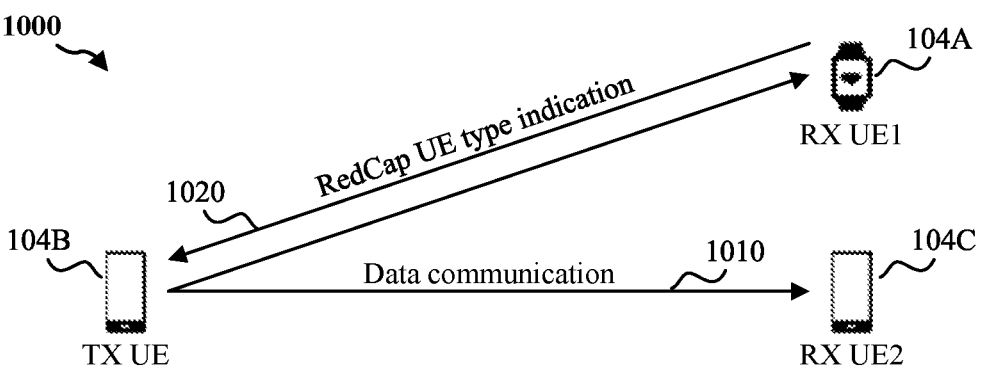
FIG. 10 is a diagram illustrating a third message flow between a RedCap UE and a non-RedCap UE, in accordance with various aspects of the present disclosure.

FIG. 10 is a diagram illustrating a third message flow comprising an indication of the RedCap UE type, between a RedCap UE and a non-RedCap UE. For example, the diagram 1000 illustrates the message flow of the RedCap UE 104A indicating to the non-RedCap UE 104B an indication of the RedCap UE type during data communication transmissions.

In step 1010, the non-RedCap UE 104B may transmit a data communication to neighboring devices (e.g., RedCap UE 104A, non-RedCap UE 104C). In some aspects, the data communication may be transmitted over a physical sidelink channel (e.g., PSSCH). For example, the data communication may comprise a groupcast transmission. That is, the non-RedCap UE 104B may transmit the data communication without the use of a communication link (e.g., sidelink) configured between the non-RedCap UE 104B and the recipients of the data communication (e.g., RedCap UE 104A, non-RedCap UE 104C). As such, transmission parameters of the data communication may not be compatible with the RedCap UE 104A, and the RedCap UE 104 may be unable to receive and/or decode the data communication. For example, a frequency range of resources (e.g., PSSCH) used by the RedCap UE 104A for the data communication may be outside of a bandwidth of the RedCap UE 104A.

Figure 12:
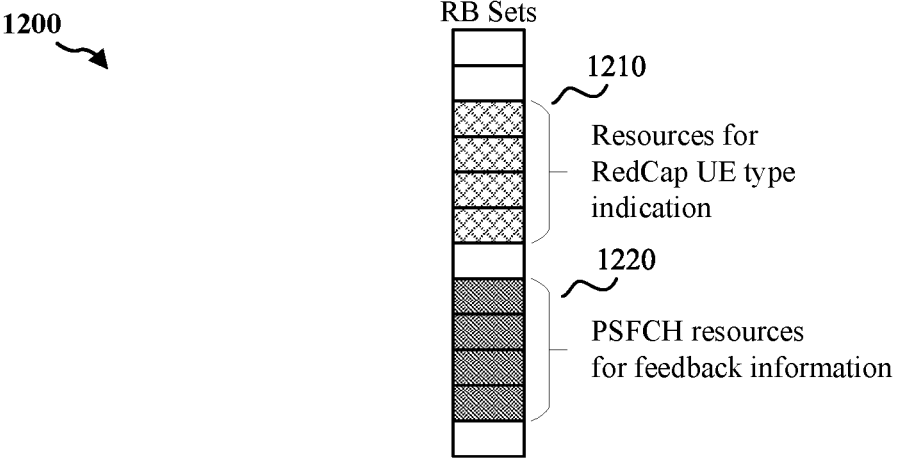
FIG. 12 is a diagram illustrating an example of resource block sets, in accordance with various aspects of the present disclosure.

Based at least on the data communication transmission, the RedCap UE 104A may transmit an indication of the RedCap UE type to the non-RedCap UE 104B, as shown in step 1020. The indication of the RedCap UE type may comprise an indication that the RedCap UE 104A is a RedCap UE. Alternatively or additionally, the indication of the RedCap UE may comprise capability information of the RedCap UE 104A. For example, the capability information may indicate Layer 1 capabilities of the RedCap UE 104, including, but not limited to, a maximum bandwidth, a maximum modulation order, and a number of MIMO spatial layers. In some aspects, the RedCap UE 104A may transmit the indication of the RedCap UE type using a conventional physical channel (e.g., PSFCH). In other aspects, the RedCap UE 104A may transmit the indication of the RedCap UE type using a new physical channel, as shown in FIG. 12. The new physical channel (e.g., resources 1210 of FIG. 12) may have a slot structure similar to a conventional PSFCH (e.g., resources 1220 of FIG. 12). That is, the new physical channel may comprise two OFDM symbols. In some aspects, a first OFDM symbol of the new physical channel may be a repetition of a second OFDM symbol of the new physical channel. Alternatively or additionally, the new physical channel may further comprise a gap symbol.

In some aspects, the non-RedCap UE 104B may dynamically enable or disable transmission of the RedCap UE type indication. For example, the non-RedCap UE 104B may transmit control information for scheduling PSSCH transmissions (e.g., SCI Format 1, SCI Format 2) indicating whether or not transmission of RedCap UE type indication is required. In other aspects, the RedCap UE 104A may transmit the RedCap UE type indication with the HARQ ACK/NACK feedback information. If or when transmission of RedCap UE type indication is enabled, the RedCap UE 104A may report capability information of the RedCap UE 104A in addition to the HARQ ACK/NACK feedback information.

Figure 11:
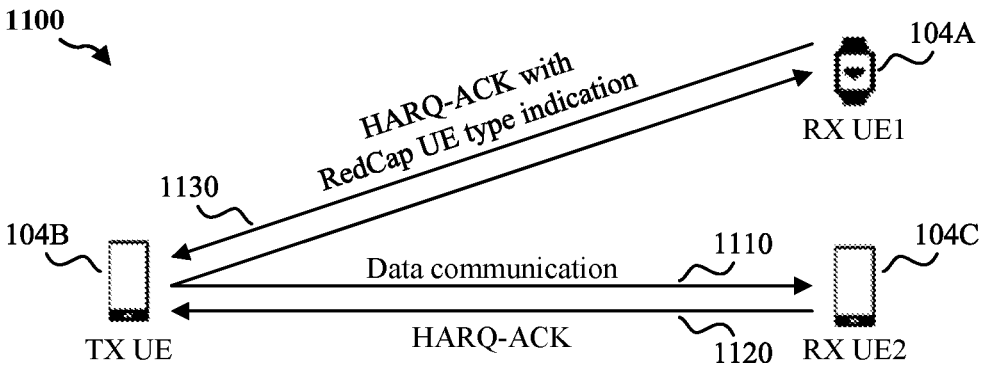
FIG. 11 is a diagram illustrating a fourth message flow between a RedCap UE and a non-RedCap UE, in accordance with various aspects of the present disclosure.

Referring to FIG. 11, the non-RedCap UE 104B may transmit a data communication to neighboring devices (e.g., RedCap UE 104A, non-RedCap UE 104C). In step 1110, the data communication may indicate that RedCap UE type indication is enabled. The non-RedCap UE 104C and the RedCap UE 104A may respond to the data communication with feedback information (e.g., HARQ-ACK) in steps 1120 and 1130, respectively. Based at least on the data communication transmission and the indication that transmission of RedCap UE type indication is enabled, the transmission of feedback information from the RedCap UE 104A in step 1130 may further comprise an indication that the RedCap UE 104A is a RedCap UE. Alternatively or additionally, the indication of the RedCap UE may comprise capability information of the RedCap UE 104A.

With further reference to FIG. 12, the RedCap UE 104A may transmit the RedCap UE type indication using resources (e.g., resources 1210) other than the resources used to transmit the feedback information (e.g., resources 1220). In some aspects, the RedCap UE 104A may determine the resources for transmitting the RedCap UE type indication according to a mapping relationship with attributes associated with a sidelink physical channel (i.e., PSSCH). For example, the mapping relationship may be based on a starting sub-channel and a slot number of a PSSCH. Alternatively or additionally, the mapping relationship may be based on a source ID and/or a destination ID of the sidelink communication link.

Alternatively or additionally, the RedCap UE 104A may transmit the RedCap UE type indication using different sequence cyclic shift values. In some aspects, the transmitted sequence cyclic shift value may provide an indication of the RedCap UE type. That is, the cyclic shift sequence selected by the RedCap UE 104A may serve as an indication of the RedCap UE type. For example, the RedCap UE 104A may determine a sequence cyclic shift value based at least on a mapping between the RedCap UE type indication and the sequence cyclic shift value. Referring to FIG. 13, the diagram illustrates examples of different mapping relationships that may be used by the RedCap UE to select a sequence cyclic shift value based at least on the RedCap UE type indication. Each mapping relationship may associate one or more capabilities of a RedCap UE with one or more sequence cyclic shift values. In some aspects, a number of possible RedCap UE capability combinations being indicated may correspond to a quantity of sequence cyclic shift values. For example, two distinct sequence cyclic shift values may be used to indicate two possible MIMO layer configurations of a RedCap UE.

In some aspects, a first mapping relationship 1310 may associate a maximum number of MIMO spatial layers of the RedCap UE with one or more sequence cyclic shift values. For example, a first sequence cyclic shift value (e.g., 0) may be associated with a RedCap UE comprising a maximum of one (1) MIMO layer. That is, the RedCap UE 104A may select a sequence cyclic shift value of zero (0) to indicate to the non-RedCap UE 104B that the RedCap UE 104A comprises a maximum of one (1) MIMO layer. Alternatively or additionally, a second sequence cyclic shift value (e.g., 6) may be associated with a RedCap UE comprising a maximum of two (2) MIMO spatial layers. That is, the RedCap UE 104A may select a sequence cyclic shift value of six (6) to indicate to the non-RedCap UE 104B that the RedCap UE 104A comprises a maximum of two (2) MIMO spatial layers.

In other aspects, a second mapping relationship 1320 may associate a maximum number of MIMO spatial layers of the RedCap UE and a maximum bandwidth of the RedCap UE with one or more sequence cyclic shift values. For example, a first sequence cyclic shift value (e.g., 0) may be associated with a RedCap UE comprising a maximum of one (1) MIMO layer and a maximum bandwidth of 20 MHz. That is, the RedCap UE 104A may select a sequence cyclic shift value of zero (0) to indicate to the non-RedCap UE 104B that the RedCap UE 104A comprises a maximum of one (1) MIMO layer and a maximum bandwidth of 20 MHz. In another example, a second sequence cyclic shift value (e.g., 3) may be associated with a RedCap UE comprising a maximum of one (1) MIMO layer and a maximum bandwidth of 40 MHz. That is, the RedCap UE 104A may select a sequence cyclic shift value of three (3) to indicate to the non-RedCap UE 104B that the RedCap UE 104A comprises a maximum of one (1) MIMO layer and a maximum bandwidth of 40 MHz. In yet another example, a third sequence cyclic shift value (e.g., 6) may be associated with a RedCap UE comprising a maximum of two (2) MIMO spatial layers and a maximum bandwidth of 20 MHz. That is, the RedCap UE 104A may select a sequence cyclic shift value of six (6) to indicate to the non-RedCap UE 104B that the RedCap UE 104A comprises a maximum of two (2) MIMO spatial layers and a maximum bandwidth of 20 MHz. In yet another example, a fourth sequence cyclic shift value (e.g., 9) may be associated with a RedCap UE comprising a maximum of two (2) MIMO spatial layers and a maximum bandwidth of 40 MHz. That is, the RedCap UE 104A may select a sequence cyclic shift value of nine (9) to indicate to the non-RedCap UE 104B that the RedCap UE 104A comprises a maximum of two (2) MIMO spatial layers and a maximum bandwidth of 40 MHz.

In yet other aspects, a third mapping relationship 1330 may associate a maximum number of MIMO spatial layers of the RedCap UE and a HARQ feedback indication with one or more sequence cyclic shift values. For example, a first sequence cyclic shift value (e.g., 0) may be associated with a RedCap UE comprising a maximum of one (1) MIMO layer and a HARQ-ACK indication. That is, the RedCap UE 104A may select a sequence cyclic shift value of zero (0) to indicate to the non-RedCap UE 104B that the RedCap UE 104A comprises a maximum of one (1) MIMO layer and a HARQ-ACK indication. In another example, a second sequence cyclic shift value (e.g., 6) may be associated with a RedCap UE comprising a maximum of one (1) MIMO layer and a HARQ-NACK indication. That is, the RedCap UE 104A may select a sequence cyclic shift value of six (6) to indicate to the non-RedCap UE 104B that the RedCap UE 104A comprises a maximum of one (1) MIMO layer and a HARQ-NACK indication. In yet another example, a third sequence cyclic shift value (e.g., 3) may be associated with a RedCap UE comprising a maximum of two (2) MIMO spatial layers and a HARQ-ACK indication. That is, the RedCap UE 104A may select a sequence cyclic shift value of three (3) to indicate to the non-RedCap UE 104B that the RedCap UE 104A comprises a maximum of two (2) MIMO spatial layers and a HARQ-ACK indication. In yet another example, a fourth sequence cyclic shift value (e.g., 9) may be associated with a RedCap UE comprising a maximum of two (2) MIMO spatial layers and a HARQ-NACK indication. That is, the RedCap UE 104A may select a sequence cyclic shift value of nine (9) to indicate to the non-RedCap UE 104B that the RedCap UE 104A comprises a maximum of two (2) MIMO spatial layers and a HARQ-NACK indication.

Figure 14:
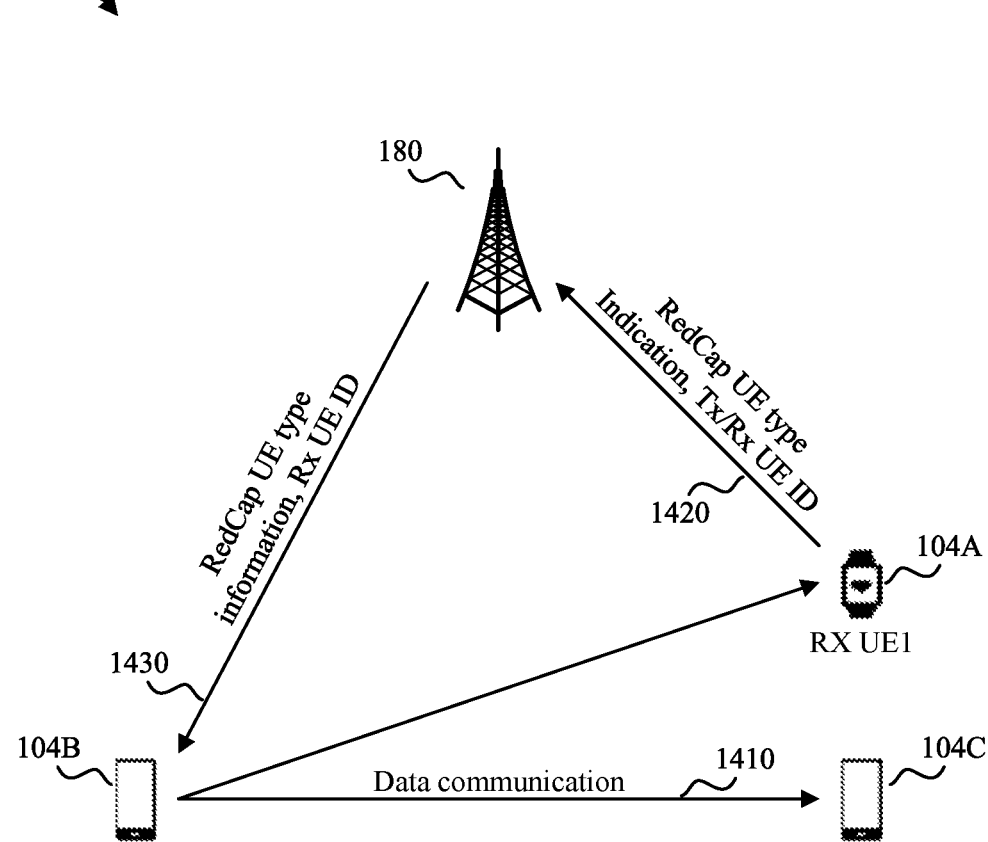
FIG. 14 is a diagram illustrating a fifth message flow between a RedCap UE and a non-RedCap UE, in accordance with various aspects of the present disclosure.

FIG. 14 is a diagram illustrating a fifth message flow comprising an indication of the RedCap UE type, between a RedCap UE and a non-RedCap UE. For example, the diagram 1400 illustrates the message flow of the RedCap UE 104A indicating to the non-RedCap UE 104B, via a network device (e.g., base station 180), an indication of the RedCap UE type during data communication transmissions. The indication of the RedCap UE type may comprise an indication that the RedCap UE 104A is a RedCap UE. In some aspects, the indication of the RedCap UE may comprise capability information of the RedCap UE 104A. Alternatively or additionally, the indication of the RedCap UE may comprise identification information of the RedCap UE 104A and/or identification information of the non-RedCap UE 104B.

In step 1410, the non-RedCap UE 104B may transmit a data communication to neighboring devices (e.g., RedCap UE 104A, non-RedCap UE 104C). In some aspects, the data communication may be transmitted over a physical sidelink channel (e.g., PSSCH). For example, the data communication may comprise a groupcast transmission. That is, the non-RedCap UE 104B may transmit the data communication without the use of a communication link (e.g., sidelink) configured between the non-RedCap UE 104B and the recipients of the data communication (e.g., RedCap UE 104A, non-RedCap UE 104C). As such, transmission parameters of the data communication may not be compatible with the RedCap UE 104A, and the RedCap UE 104 may be unable to receive and/or decode the data communication. For example, a frequency range of resources (e.g., PSSCH) used by the RedCap UE 104A for the data communication may be outside of a bandwidth of the RedCap UE 104A.

Based at least on the data communication transmission, the RedCap UE 104A may request the network device 180 (e.g., gNB) to forward one or more physical layer capabilities of the RedCap UE 104A to the non-RedCap UE 104B, as shown in step 1420. That is, the RedCap UE 104 may transmit an indication of the RedCap UE type to the network device 180 (e.g., gNB). For example, the RedCap UE 104A may transmit the indication of the RedCap UE type in response to failing to decode the data communication transmission. The indication of the RedCap UE type may comprise an indication that the RedCap UE 104A is a RedCap UE. In some aspects, the indication of the RedCap UE may comprise capability information of the RedCap UE 104A. For example, the capability information may indicate Layer 1 capabilities of the RedCap UE 104, including, but not limited to, a maximum bandwidth, a maximum modulation order, and a number of MIMO spatial layers. Alternatively or additionally, the indication of the RedCap UE may comprise identification information of the RedCap UE 104A and/or identification information of the non-RedCap UE

104B. For example, the identification information may comprise at least one of a MAC layer identification, a RLC layer identification, a PDCP layer identification, a NAS layer identification, an IP layer identification, and an application layer identification. In another example, the identification information may further comprise a mapping between the identification information to a cell radio network temporary identifier (C-RNTI).

In step 1430, the network device 180 may transmit, to the non-RedCap UE 104B, the RedCap UE type indication from the RedCap UE 104A. In some aspects, the network device 180 may transmit identification information of the RedCap UE 104A. The non-RedCap UE 104B may reconfigure transmission parameters for subsequent data communication transmissions based at least on the RedCap UE type indication received from the network device 180. For example, the non-RedCap UE 104B may transmit another data communication to neighboring devices (e.g., RedCap UE 104A, non-RedCap UE 104C) using the reconfigured transmission parameters.

Figure 15:
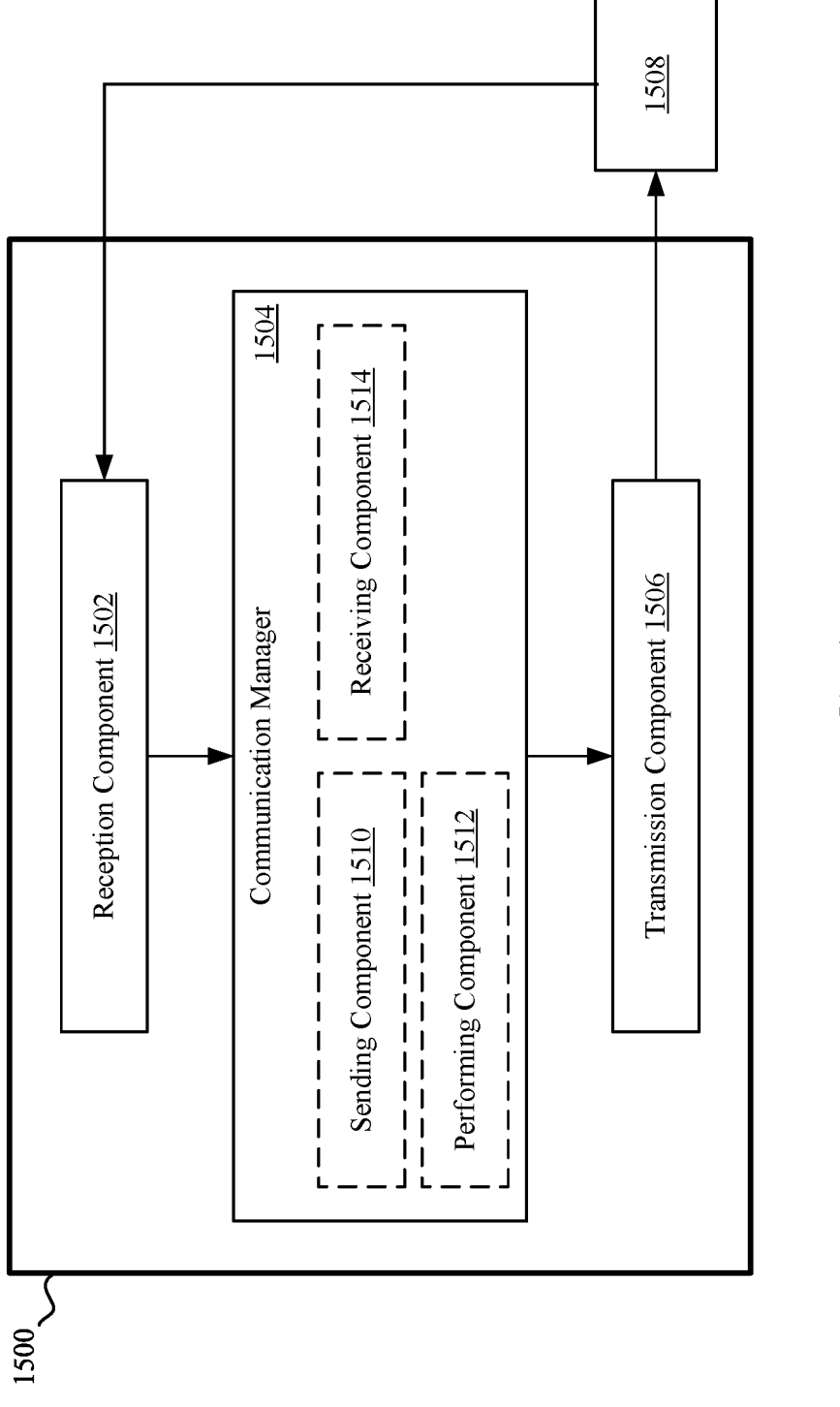
FIG. 15 is a diagram illustrating an example apparatus in accordance with various aspects of the present disclosure.

FIG. 15 is a block diagram of an example apparatus 1500 for wireless communication. The apparatus 1500 may be a RedCap UE (e.g., UE 104 of FIG. 1, device 450 of FIG. 4, RedCap UE 104A of FIGS. 6-7, 9-11, 14) or a RedCap UE may include the apparatus 1500. In some aspects, apparatus 1500 includes a reception component 1502 configured to receive sidelink communications from another apparatus (e.g., apparatus 1508), a communication manager 1504 configured to perform sidelink communications, a transmission component 1506 configured to transmit sidelink communications to the apparatus 1508, and which may be in communication with one another (for example, via one or more buses or electrical connections). As shown, the apparatus 1500 may communication with another apparatus 1508 (such as a non-RedCap UE, a base station, or another wireless communication device) using the reception component 1502 and the transmission component 1506.

In some aspects, the apparatus 1500 may be configured to perform one or more operations described herein in connection with FIGS. 5-14. Additionally or alternatively, the apparatus 1500 may be configured to perform one or more processes described herein, such as method 1600 of FIGS. 16-19. In some aspects, the apparatus 1500 may include one or more components of the UE described above in connection with FIGS. 1 and 4.

The reception component 1502 may receive communications, such as reference signals, control information, data communications, or a combination thereof, from the apparatus 1508. The reception component 1502 may provide received communications to one or more other components of the apparatus 1500, such as the communication manager 1504. In some aspects, the reception component 1502 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1502 may include one or more antennas, a demodulator, a MIMO detector, a receive processor, a controller/processor, a memory, or a combination thereof, of the UE described above in connection with FIGS. 1 and 4.

The transmission component 1506 may transmit communications, such as reference signals, control information, data communications, or a combination thereof, to the apparatus 1508. In some aspects, the communication manager 1504 may generate communications and may transmit the generated communications to the transmission component 1506 for transmission to the apparatus 1508. In some aspects, the transmission component 1506 may perform signal processing on the generated communications (such as filtering, amplification, modulation, digital-to-analog conversion, multiplexing, interleaving, mapping, or encoding, among other examples), and may transmit the processed signals to the apparatus 1508. In other aspects, the transmission component 1506 may include one or more antennas, a modulator, a transmit MIMO processor, a transmit processor, a controller/processor, a memory, or a combination thereof, of the UE described above in connection with FIGS. 1 and 4. In some aspects, the transmission component 1506 may be co-located with the reception component 1502 in a transceiver or transceiver component.

The communication manager 1504 may send indications indicating a UE type for sidelink communication to the apparatus 1508 and may perform sidelink communications with the apparatus 1508 in accordance with the indicated UE type. For example, the communication manager 1504 may send an SSB comprising the indication indicating the UE type for the sidelink communication. In another example, the communication manager 1504 may send UE capability information indicating at least one reduced capability of the apparatus 1500, in response to a UE capability request. In yet another example, the communication manager 1504 may send a discovery message comprising the indication indicating the UE type for the sidelink communication. Alternatively or additionally, communication manager 1504 may send the indication indicating the UE type for the sidelink communication via a PSFCH. In some aspects, the communication manager 1504 may include a controller/processor, a memory, or a combination thereof, of the UE described above in connection with FIGS. 1 and 4.

In some aspects, the communication manager 1504 may include a set of components, such as a sending component 1510, a performing component 1512, a receiving component 1514, or a combination thereof. Alternatively, the set of components may be separate and distinct from the communication manager 1504. In some aspects, one or more components of the set of components may include or may be implemented within a controller/processor, a memory, or a combination thereof, of the UE described above in connection with FIGS. 1 and 4. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The sending component 1510 may send indications indicating a UE type for sidelink communication to the apparatus 1508. The indication of the UE type may comprise an indication whether the apparatus 1508 is a RedCap UE. In some aspects, the indication of the UE type may comprise capability information of the apparatus 1508. For example, the capability information may indicate Layer 1 capabilities of the apparatus 1508, including, but not limited to, a maximum bandwidth, a maximum modulation order, and a number of MIMO spatial layers Alternatively or additionally, the indication of the UE type may comprise identification information of the apparatus 1508.

The performing component 1512 may perform sidelink communications with the apparatus 1508 in accordance with the indicated UE type. For example, the performing component 1512 may, as part of the sidelink communications, transmit data and/or control information to apparatus 1508 via a sidelink physical channel (e.g., PSCCH, PSSCH, PSFCH). Alternatively or additionally, the performing component 1512 may, as part of the sidelink communications, receive data and/or control information from apparatus 1508 via a sidelink physical channel (e.g., PSCCH, PSSCH, PSFCH). In some aspects, the performing component 1512 may request apparatus 1508 to forward one or more physical layer capabilities of the apparatus 1500 to another apparatus.

The receiving component 1514 may receive requests from apparatus 1508. For example, the receiving component 1514 may receive a UE capability request from apparatus 1508. In another example, the receiving component 1514 may receive a connection request from apparatus 1508 in response to a discovery message.

Referring to FIGS. 16-19, in operation, a first UE 450 may perform a method 1600 of wireless communication. The method 1600 may be performed by the first UE 450 (which may include the memory 460 and which may be the entire first UE 450 or a component of the UE 104 such as the sidelink identification component 198, the TX processor 468, the RX processor 456, or the controller/processor 459). The method 1600 may be performed by the UE sidelink identification component 198 in communication with a second UE 410.

Figure 16:
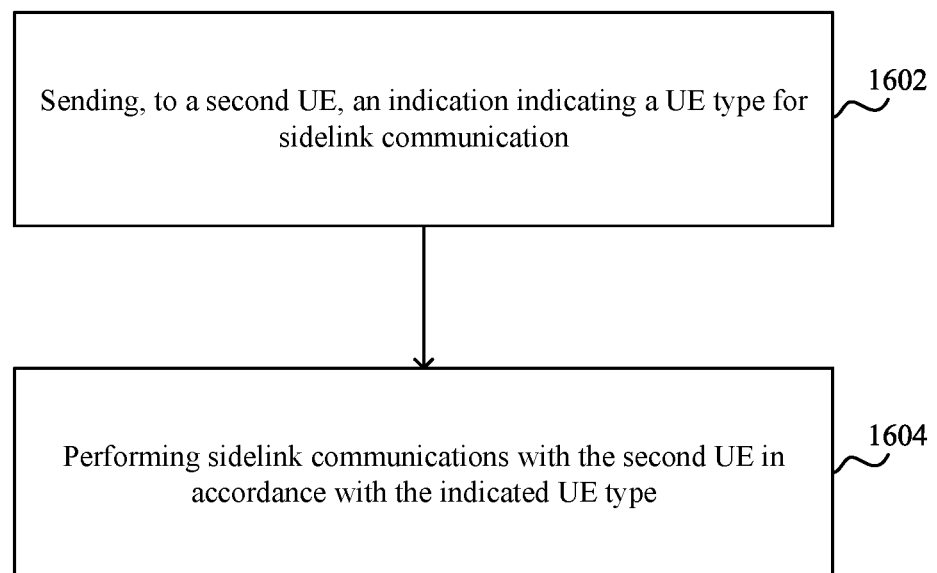
FIG. 16 is a flowchart of a method of wireless communication to be performed by a UE in accordance with various aspects of the present disclosure.

At block 1602 of FIG. 16, the method 1600 includes sending, to a second UE, an indication indicating a UE type for sidelink communication. For example, in an aspect, the first UE 450, the sidelink identification component 198, and/or the sending component 1510 may be configured to or may comprise means for sending, to second UE 410, the indication indicating the UE type for sidelink communication.

For example, the sending at block 1602 may include sending a sidelink SSB (SL-SSB) comprising the indication indicating the UE type for sidelink communication. In some aspects, the SL-SSB may be transmitted over a PSBCH. In other aspects, one or more reserved bits of a PSBCH payload may be reinterpreted as the indication indicating the UE type for sidelink communication.

In some optional or additional aspects, the sending at block 1602 may include sending a discovery message (e.g., presence announcement) to neighboring devices of the first UE 450 (e.g., second UE 410, apparatus 1508), as part of a discovery procedure. The discovery message may comprise the indication indicating the UE type for sidelink communication. Additionally or alternatively, the discovery message may comprise a GSS and/or a RBS signal. In other aspects, the discovery message may be transmitted on the PSCCH or on the PSSCH.

In some optional or additional aspects, the indication indicating the UE type for sidelink communication may indicate the first UE 450 as a RedCap UE device.

Further, for example, the sending at block 1602 may be performed to provide the indication of the UE type for sidelink communication to the second UE 410. Such an indication may allow the second UE 410 to configure proper transmission parameters to perform the sidelink communication with first UE 450. Thus, aspects presented herein may reduce complexity and latency of the wireless communication system.

At block 1604, the method 1600 may include performing sidelink communications with the second UE in accordance with the indicated UE type. For example, in an aspect, the first UE 450, the sidelink identification component 198, and/or performing component 1512 may be configured to or may comprise means for performing sidelink communications with the second UE 410 in accordance with the indicated UE type.

For example, the performing at block 1604 may include establishing a sidelink (e.g., PC5, V2V, V2X) link between the first UE 450 and second UE 410 according to the indicated UE type. The performing at block 1604 may include exchanging data and/or control signal transmissions by the first UE 450 and the second UE 410 on one or more sidelink channels (e.g., PSCCH, PSSCH).

In some optional or additional aspects, the performing at block 1604 may include receiving, from second UE 410, a connection request, in response to a discovery message.

Further, for example, the performing at block 1604 may be performed to establish a sidelink communication channel between the first UE 450 and the second UE 410 without the need for a base station. Thus, aspects presented herein may reduce complexity and power consumption of a wireless communication system.

Figure 17:
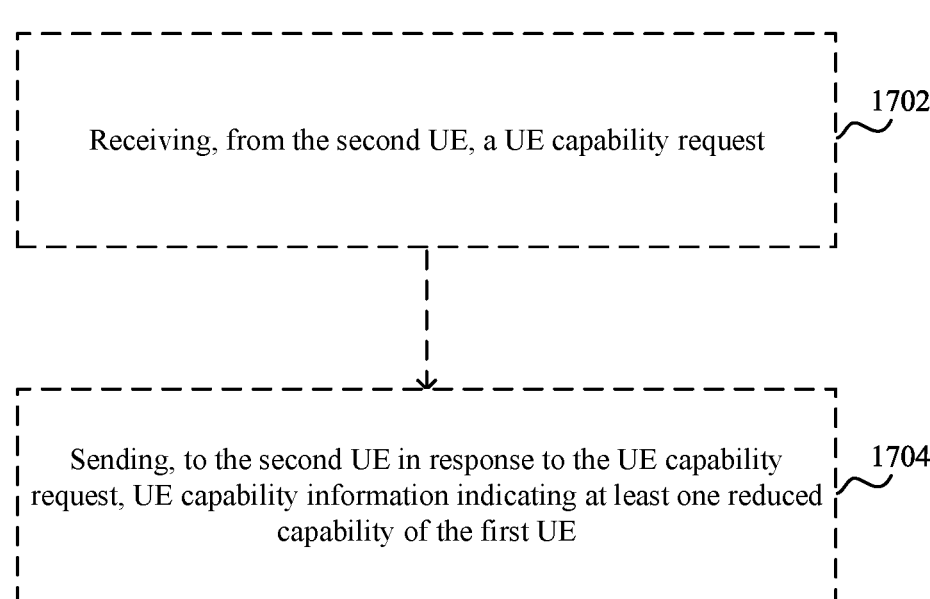
FIG. 17 is a flowchart of first additional or optional steps for a method of wireless communication to be performed by a UE in accordance with various aspects of the present disclosure.

Referring to FIG. 17, in an optional or additional aspect, in block 1702, the method 1600 may further include receiving, from the second UE, a UE capability request. For example, in an aspect, the first UE 450, the sidelink identification component 198, and/or receiving component 1514 may be configured to or may comprise means for receiving, from the second UE 410, the UE capability request.

For example, the receiving at block 1702 may include requesting, by the second UE 410 from the first UE 450, additional RedCap UE type and/or capability information as part of capability negotiations for establishing the sidelink communication link. In some aspects, the first UE 450 and the second UE 410 may reuse conventional PC5-RRC signaling to exchange capability information (e.g., UECapabilityEnquirySidelink). In other aspects, the first UE 450 and the second UE 410 may add new fields to conventional PC5-RRC signaling to indicate the RedCap UE type and/or capability information.

Further, for example, the receiving at block 1702 may be performed to negotiate capabilities between the second UE 410 and the first UE 450 based at least on additional capability information of the first UE 450. Such a negotiation may allow the second UE 410 to configure proper transmission parameters to perform the sidelink communication with the first UE 450. Thus, aspects presented herein may reduce complexity and latency of the wireless communication system.

In this additional or optional aspect, in block 1704, the sending in block 1602 may include sending, to the second UE in response to the UE capability request, UE capability information indicating at least one reduced capability of the first UE. For example, in an aspect, the first UE 450, the sidelink identification component 198, and/or sending component 1510 may be configured to or may comprise means for sending, to the second UE 410 in response to the UE capability request, UE capability information indicating at least one reduced capability of the first UE 450. For example, the sending at block 1704 may include reporting the UE capability information requested by the second UE 410. For example, the first UE 450 may send a UECapabilityInformationSidelink message to the second UE 410 providing the requested capability information. The reported capability information may comprise a maximum bandwidth information, a number of receive branches or antennas, a number of MIMO spatial layers, a maximum modulation order, and the like.

Further, for example, the sending at block 1704 may be performed to negotiate capabilities between the second UE

410 and the first UE 450 based at least on additional capability information of the first UE 450.

Figure 18:
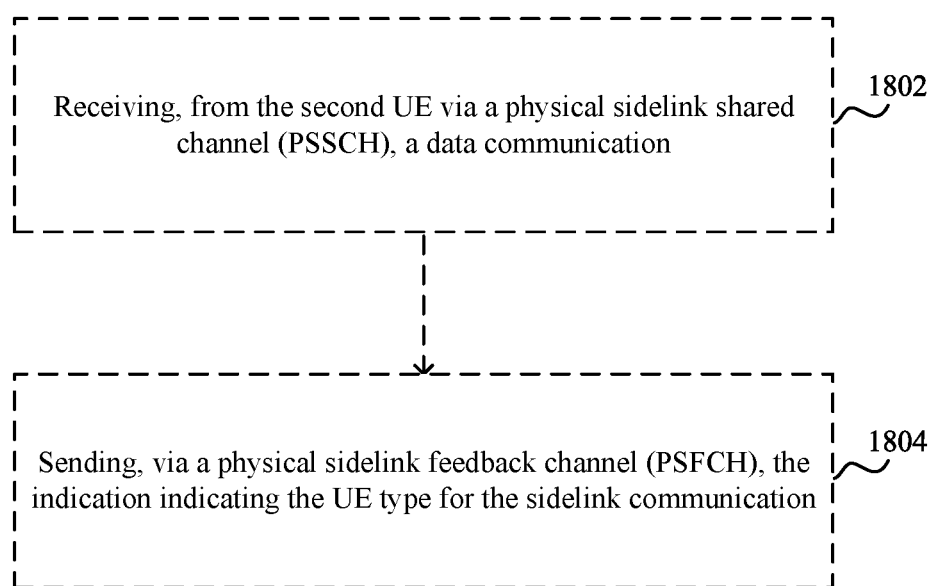
FIG. 18 is a flowchart of second additional or optional steps for a method of wireless communication to be performed by a UE in accordance with various aspects of the present disclosure.

Referring to FIG. 18, in another optional or additional aspect, in block 1802, the method 1600 may further include receiving, from the second UE via a PSSCH, a data communication. For example, in an aspect, the first UE 450, the sidelink identification component 198, and/or receiving component 1514 may be configured to or may comprise means for receiving, from the second UE 410 via the PSSCH, the data communication.

For example, the receiving at block 1802 may include receiving the data communication that the second UE 410 has transmitted to neighboring devices (e.g., first UE 450). For example, the data communication may comprise a groupcast transmission. That is, the second UE 410 may transmit the data communication without the use of a communication link (e.g., sidelink) configured between the second UE 410 and the recipients of the data communication (e.g., first UE 450).

Further, for example, the receiving at block 1802 may be performed to receive the data communication transmitted by the second UE 410.

In this additional or optional aspect, in block 1804, the sending in block 1602 may include sending, via a PSFCH, the indication indicating the UE type for the sidelink communication. For example, in an aspect, the first UE 450, the sidelink identification component 198, and/or sending component 1510 may be configured to or may comprise means for sending, via the PSFCH, the indication indicating the UE type for the sidelink communication.

For example, the sending at block 1804 may include transmitting, by the first UE 450 to the second UE 410 the indication indicating the UE type for the sidelink communication. The indication may comprise an indication that the first UE 450 is a RedCap UE. Alternatively or additionally, the indication indicating the UE type for the sidelink communication may comprise capability information of the first UE 450. For example, the capability information may indicate Layer 1 capabilities of the first UE 450, including, but not limited to, a maximum bandwidth, a maximum modulation order, and a number of MIMO spatial layers.

In another example, the sending at block 1804 may include determining a resource from PSFCH resources to send, via the PSFCH, the indication indicating the UE type for the sidelink communication. The PSFCH resource may be determined based at least on one of a starting sub-channel of the PSSCH, a slot index of the PSSCH, a source identification of a sidelink communication link, a destination identification of the sidelink communication link, and a combination of thereof.

In another example, the sending at block 1804 may include sending, via the PSFCH, HARQ feedback information (e.g., HARQ-ACK, HARQ-NACK) for the data communication. In some aspects, the PSFCH resources for sending the HARQ feedback information may be separately configured from the PSFCH resources for indicating the UE type for the sidelink communication.

In another example, the sending at block 1804 may include accessing a mapping relationship between a plurality of cyclic shift sequences associated with the PSFCH and one or more physical layer capabilities of the first UE 450. The one or more physical layer capabilities of the first UE 450 may comprise at least one of a maximum bandwidth information, a maximum modulation order, a quantity of MIMO spatial layers, and a combination of thereof.

Further, for example, the sending at block 1804 may be performed to allow the second UE 410 to configure proper transmission parameters to perform the sidelink communication with the first UE 450. Thus, aspects presented herein may reduce complexity and latency of the wireless communication system.

Referring to FIG. 19, in another optional or additional aspect, in block 1902, the method 1600 may further include receiving, from the second UE via a PSSCH, a first data communication. For example, in an aspect, the first UE 450, the sidelink identification component 198, and/or receiving component 1514 may be configured to or may comprise means for receiving, from the second UE 410 via the PSSCH, the first data communication.

For example, the receiving at block 1902 may include receiving the data communication that the second UE 410 has transmitted to neighboring devices (e.g., first UE 450). For example, the data communication may comprise a groupcast transmission. That is, the second UE 410 may transmit the data communication without the use of a communication link (e.g., sidelink) configured between the second UE 410 and the recipients of the data communication (e.g., first UE 450).

Further, for example, the receiving at block 1902 may be performed to receive the data communication transmitted by the second UE 410.

In this additional or optional aspect, in block 1904, the sending in block 1602 may include sending, in response to a failure to decode the first data communication, a request to a network device to forward one or more physical layer capabilities of the first UE to the second UE, wherein the request comprises a first identification of the first UE and a second identification of the second UE. For example, in an aspect, the first UE 450, the sidelink identification component 198, and/or sending component 1510 may be configured to or may comprise means for sending, in response to the failure to decode the first data communication, the request to the network device 180 to forward one or more physical layer capabilities of the first UE 450 to the second UE 410, wherein the request comprises a first identification of the first UE 450 and a second identification of the second UE 410.

For example, the sending at block 1904 may include transmitting the indication indicating the UE type for sidelink communication to the network device 180. The indication may comprise an indication that the first UE 450 is a RedCap UE. In some aspects, the indication indicating the UE type for sidelink communication may comprise capability information of the first UE 450. For example, the capability information may indicate Layer 1 capabilities of the first UE 450, including, but not limited to, a maximum bandwidth, a maximum modulation order, and a number of MIMO spatial layers. Alternatively or additionally, the indication indicating the UE type for sidelink communication may comprise identification information of the first UE 450 and/or identification information of the second UE 410. For example, the identification information may comprise at least one of a MAC layer identification, a RLC layer identification, a PDCP layer identification, a NAS layer identification, an IP layer identification, and an application layer identification. In another example, the identification information may further comprise a mapping between the identification information to a C-RNTI.

In another example, the sending at block 1904 may cause the network device 180 to transmit, to the second UE 410, the indication indicating the UE type for sidelink communication from the first UE 450.

Further, for example, the sending at block 1904 may be performed to provide the indication of the UE type for sidelink communication to the second UE 410. Such an indication may allow the second UE 410 to configure proper transmission parameters to perform the sidelink communication with first UE 450. Thus, aspects presented herein may reduce complexity and latency of the wireless communication system.

In this additional or optional aspect, in block 1906, the method 1600 may further include receiving, from the second UE, a second data communication configured according to the one or more physical layer capabilities of the first UE. For example, in an aspect, the first UE 450, the sidelink identification component 198, and/or receiving component 1514 may be configured to or may comprise means for receiving, from the second UE 410, a second data communication configured according to the one or more physical layer capabilities of the first UE 450.

For example, the receiving at block 1906 may include reconfiguration, by the second UE 410, of transmission parameters for subsequent sidelink communication with first UE 450, based at least on the indication indicating the UE type for sidelink communication of the first UE 450.

Further, for example, the receiving at block 1906 may be performed to receive the second data communication transmitted by the second UE 410.

Implementation examples are described in the following numbered clauses:

1. A method of wireless communication by a first user equipment (UE), comprising:
sending, to a second UE, an indication indicating a UE type for sidelink communication; and
performing sidelink communications with the second UE in accordance with the indicated UE type.

2. The method of clause 1, wherein:
the first UE is a reduced capability UE (RedCap UE) device;
the second UE is a non-RedCap UE device; and
the indication indicating the UE type comprises indicating the first UE as the RedCap UE device.

3. The method of clause 1 or clause 2, wherein sending the indication comprises:
sending, to the second UE, a synchronization signal block (SSB) comprising the indication indicating the UE type for the sidelink communication.

4. The method of any of clauses 1-3, further comprising:
receiving, from the second UE, a UE capability request; and
wherein sending the indication comprises sending, to the second UE in response to the UE capability request, UE capability information indicating at least one reduced capability of the first UE.

5. The method of any of clauses 1-4, wherein:
sending the indication comprises sending, to the second UE, a discovery message comprising the indication indicating the UE type for the sidelink communication; and
the method further comprises receiving, from the second UE in response to the discovery message, a connection request.

6. The method of any of clauses 1-5, further comprising:
receiving, from the second UE via a physical sidelink shared channel (PSSCH), a data communication; and
wherein sending the indication comprises sending, via a physical sidelink feedback channel (PSFCH), the indication indicating the UE type for the sidelink communication.

7. The method of clause 6, wherein sending, via the PSFCH, the indication comprises:

determining a resource from PSFCH resources to send, via the PSFCH, the indication indicating the UE type for the sidelink communication based on at least one of:

a starting sub-channel of the PSSCH;

a slot index of the PSSCH;

a source identification of a sidelink communication link;

a destination identification of the sidelink communication link; and a combination of thereof 8. The method of clause 6 or clause 7, further comprising:

sending, via the PSFCH, a hybrid automatic repeat request acknowledgement (HARQ-ACK) feedback for the data communication, wherein first PSFCH resources for sending the HARQ-ACK feedback are separately configured from second PSFCH resources for indicating the UE type for the sidelink communication.

9. The method of any of clauses 6-8, further comprising:

receiving, from the second UE, a sidelink control information (SCI) enabling indicating the UE type for the sidelink communication, the SCI scheduling the data communication; and wherein sending the indication comprises sending, via the PSSCH, one or more physical layer capabilities of the first UE.

10. The method of any of clauses 6-8, wherein sending the indication comprises:

accessing a mapping relationship between a plurality of cyclic shift sequences associated with the PSFCH and one or more physical layer capabilities of the first UE.

11. The method of clause 10, wherein the one or more physical layer capabilities of the first UE comprises at least one of:

a maximum bandwidth information;

a maximum modulation order;

a quantity of multiple-input multiple-output (MIMO) spatial layers; and a combination of thereof.

12. The method of any of clauses 1-11, further comprises:

receiving, from the second UE via a physical sidelink shared channel (PSSCH), a first data communication;

wherein sending the indication comprises sending, in response to a failure to decode the first data communication, a request to a network device to forward one or more physical layer capabilities of the first UE to the second UE, the request comprising a first identification of the first UE and a second identification of the second UE; and receiving, from the second UE, a second data communication configured according to the one or more physical layer capabilities of the first UE.

13. The method of clause 12, wherein the first identification and the second identification comprise at least one of a medium access control (MAC) layer identification, a radio link control (RLC) layer identification, a packet data convergence control (PDCP) layer identification, a non-access stratum (NAS) layer identification, an internet protocol (IP) layer identification, an application layer identification, and a mapping between the first identification and the second identification to a cell radio network temporary identifier (C-RNTI).

14. An apparatus for wireless communication by a first user equipment (UE), comprising:

a memory; and a processor communicatively coupled with the memory and configured to:

send, to a second UE, an indication indicating a UE type for sidelink communication; and perform sidelink communications with the second UE in accordance with the indicated UE type.

15. The apparatus of clause 14, wherein:

the first UE is a reduced capability UE (RedCap UE) device;

the second UE is a non-RedCap UE device; and the indication indicating the UE type comprises indicating the first UE as the RedCap UE device.

16. The apparatus of clause 14 or clause 15, wherein to send the indication comprises to:

send, to the second UE, a synchronization signal block (SSB) comprising the indication indicating the UE type for the sidelink communication.

17. The apparatus of any of clauses 14-16, wherein the processor is further configured to:

receive, from the second UE, a UE capability request; and wherein to send the indication comprises to send, to the second UE in response to the UE capability request, UE capability information indicating at least one reduced capability of the first UE.

18. The apparatus of any of clauses 14-17, wherein:

to send the indication comprises to send, to the second UE, a discovery message comprising the indication indicating the UE type for the sidelink communication; and the processor is further configured to receive, from the second UE in response to the discovery message, a connection request.

19. The apparatus of any of clauses 14-19, wherein the processor is further configured to:

receive, from the second UE via a physical sidelink shared channel (PSSCH), a data communication; and wherein to send the indication comprises to send, via a physical sidelink feedback channel (PSFCH), the indication indicating the UE type for the sidelink communication.

20. The apparatus of clause 19, wherein to send, via the PSFCH, the indication comprises to:

determine a resource from PSFCH resources to send, via the PSFCH, the indication indicating the UE type for the sidelink communication based on at least one of:

a starting sub-channel of the PSSCH;

a slot index of the PSSCH;

a source identification of a sidelink communication link;

a destination identification of the sidelink communication link; and a combination of thereof.

21. The apparatus of clause 19 or clause 20, wherein the processor is further configured to:

send, via the PSFCH, a hybrid automatic repeat request acknowledgement (HARQ-ACK) feedback for the data communication, wherein first PSFCH resources for sending the HARQ-ACK feedback are separately configured from second PSFCH resources for indicating the UE type for the sidelink communication.

22. The apparatus of any of clauses 19-21, wherein the processor is further configured to:

receive, from the second UE, a sidelink control information (SCI) enabling indicating the UE type for the sidelink communication, the SCI scheduling the data communication; and wherein to send the indication comprises to send, via the PSSCH, one or more physical layer capabilities of the first UE.

23. The apparatus of any of clauses 19-22, wherein to send the indication comprises to:

access a mapping relationship between a plurality of cyclic shift sequences associated with the PSFCH and one or more physical layer capabilities of the first UE.

24. The apparatus of clause 23, wherein the one or more physical layer capabilities of the first UE comprises at least one of:

a maximum bandwidth information;

a maximum modulation order;

a quantity of multiple-input multiple-output (MIMO) spatial layers; and a combination of thereof 25. The apparatus of any of clauses 14-24, wherein the processor is further configured to:

receive, from the second UE via a physical sidelink shared channel (PSSCH), a first data communication;

wherein to send the indication comprises to send, in response to a failure to decode the first data communication, a request to a network device to forward one or more physical layer capabilities of the first UE to the second UE, the request comprising a first identification of the first UE and a second identification of the second UE; and receive, from the second UE, a second data communication configured according to the one or more physical layer capabilities of the first UE.

26. The apparatus of clause 25, wherein the first identification and the second identification comprise at least one of a medium access control (MAC) layer identification, a radio link control (RLC) layer identification, a packet data convergence control (PDCP) layer identification, a non-access stratum (NAS) layer identification, an internet protocol (IP) layer identification, an application layer identification, and a mapping between the first identification and the second identification to a cell radio network temporary identifier (C-RNTI).

27. An apparatus for wireless communication by a first user equipment (UE), comprising:

means for sending, to a second UE, an indication indicating a UE type for sidelink communication; and means for performing sidelink communications with the second UE in accordance with the indicated UE type.

28. The apparatus of clause 27, wherein:

the first UE is a reduced capability UE (RedCap UE) device;

the second UE is a non-RedCap UE device; and the indication indicating the UE type comprises indicating the first UE as the RedCap UE device.

29. The apparatus of clause 27 or clause 28, wherein the means for sending the indication comprises:

means for sending, to the second UE, a synchronization signal block (SSB) comprising the indication indicating the UE type for the sidelink communication.

30. The apparatus of any of clauses 27-29, further comprising:

means for receiving, from the second UE, a UE capability request; and wherein the means for sending the indication comprises means for sending, to the second UE in response to the UE capability request, UE capability information indicating at least one reduced capability of the first UE.

31. The apparatus of any of clauses 27-30, wherein:

the means for sending the indication comprises means for sending, to the second UE, a discovery message comprising the indication indicating the UE type for the sidelink communication; and the apparatus further comprises means for receiving, from the second UE in response to the discovery message, a connection request.

32. The apparatus of any of clauses 27-31, further comprising:

means for receiving, from the second UE via a physical sidelink shared channel (PSSCH), a data communication; and wherein the means for sending the indication comprises means for sending, via a physical sidelink feedback channel (PSFCH), the indication indicating the UE type for the sidelink communication.

33. The apparatus of clause 32, wherein the means for sending, via the PSFCH, the indication comprises:

means for determining a resource from PSFCH resources to send, via the PSFCH, the indication indicating the UE type for the sidelink communication based on at least one of:

a starting sub-channel of the PSSCH;

a slot index of the PSSCH;

a source identification of a sidelink communication link;

a destination identification of the sidelink communication link; and a combination of thereof 34. The apparatus of clause 32 or clause 33, further comprising:

means for sending, via the PSFCH, a hybrid automatic repeat request acknowledgement (HARQ-ACK) feedback for the data communication, wherein first PSFCH resources for sending the HARQ-ACK feedback are separately configured from second PSFCH resources for indicating the UE type for the sidelink communication.

35. The apparatus of any of clauses 32-34, further comprising:

means for receiving, from the second UE, a sidelink control information (SCI) enabling indicating the UE type for the sidelink communication, the SCI scheduling the data communication; and wherein the means for sending the indication comprises means for sending, via the PSSCH, one or more physical layer capabilities of the first UE.

36. The apparatus of any of clauses 32-35, wherein the means for sending the indication comprises:

means for accessing a mapping relationship between a plurality of cyclic shift sequences associated with the PSFCH and one or more physical layer capabilities of the first UE.

37. The apparatus of clause 36, wherein the one or more physical layer capabilities of the first UE comprises at least one of:

a maximum bandwidth information;

a maximum modulation order;

a quantity of multiple-input multiple-output (MIMO) spatial layers; and a combination of thereof 38. The apparatus of any of clauses 27-37, further comprises:

means for receiving, from the second UE via a physical sidelink shared channel (PSSCH), a first data communication;

wherein the means for sending the indication comprises means for sending, in response to a failure to decode the first data communication, a request to a network device to forward one or more physical layer capabilities of the first UE to the second UE, the request comprising a first identification of the first UE and a second identification of the second UE; and receiving, from the second UE, a second data communication configured according to the one or more physical layer capabilities of the first UE.

39. The apparatus of clause 39, wherein the first identification and the second identification comprise at least one of a medium access control (MAC) layer identification, a radio link control (RLC) layer identification, a packet data convergence control (PDCP) layer identification, a non-access stratum (NAS) layer identification, an internet protocol (IP) layer identification, an application layer identification, and a mapping between the first identification and the second identification to a cell radio network temporary identifier (C-RNTI).

40. A non-transitory computer-readable medium comprising stored instructions for wireless communication by a first user equipment (UE), executable by a processor to:

send, to a second UE, an indication indicating a UE type for sidelink communication; and perform sidelink communications with the second UE in accordance with the indicated UE type.

41. The non-transitory computer-readable medium of clause 40, wherein:

the first UE is a reduced capability UE (RedCap UE) device;

the second UE is a non-RedCap UE device; and the indication indicating the UE type comprises indicating the first UE as the RedCap UE device.

42. The non-transitory computer-readable medium of clause 40 or clause 41, wherein the instructions to send the indication comprise further instructions to:

send, to the second UE, a synchronization signal block (SSB) comprising the indication indicating the UE type for the sidelink communication.

43. The non-transitory computer-readable medium of any of clauses 40-42, further comprising instructions to:

receive, from the second UE, a UE capability request; and wherein the instructions to send the indication comprises further instructions to send, to the second UE in response to the UE capability request, UE capability information indicating at least one reduced capability of the first UE.

44. The non-transitory computer-readable medium of any of clauses 40-43, wherein:

the instructions to send the indication comprise further instructions to send, to the second UE, a discovery message comprising the indication indicating the UE type for the sidelink communication; and the non-transitory computer-readable medium further comprises instructions to receive, from the second UE in response to the discovery message, a connection request.

45. The non-transitory computer-readable medium of any of clauses 40-44, further comprising instructions to:

receive, from the second UE via a physical sidelink shared channel (PSSCH), a data communication; and wherein the instructions to send the indication comprise further instructions to send, via a physical sidelink feedback channel (PSFCH), the indication indicating the UE type for the sidelink communication.

46. The non-transitory computer-readable medium of clause 45, wherein the instructions to send, via the PSFCH, the indication comprises further instructions to:

determine a resource from PSFCH resources to send, via the PSFCH, the indication indicating the UE type for the sidelink communication based on at least one of:

a starting sub-channel of the PSSCH;

a slot index of the PSSCH;

a source identification of a sidelink communication link;

a destination identification of the sidelink communication link; and a combination of thereof 47. The non-transitory computer-readable medium of clause 45 or clause 46, further comprising instructions to:

send, via the PSFCH, a hybrid automatic repeat request acknowledgement (HARQ-ACK) feedback for the data communication, wherein first PSFCH resources for sending the HARQ-ACK feedback are separately configured from second PSFCH resources for indicating the UE type for the sidelink communication.

48. The non-transitory computer-readable medium of any of clauses 45-47, further comprising instructions to:

receive, from the second UE, a sidelink control information (SCI) enabling indicating the UE type for the sidelink communication, the SCI scheduling the data communication; and wherein the instructions to send the indication comprise further instructions to send, via the PSSCH, one or more physical layer capabilities of the first UE.

49. The non-transitory computer-readable medium of any of clauses 45-48, wherein the instructions to send the indication comprise further instructions to:

access a mapping relationship between a plurality of cyclic shift sequences associated with the PSFCH and one or more physical layer capabilities of the first UE.

50. The non-transitory computer-readable medium of clause 49, wherein the one or more physical layer capabilities of the first UE comprises at least one of:

a maximum bandwidth information;

a maximum modulation order;

a quantity of multiple-input multiple-output (MIMO) spatial layers; and a combination of thereof 51. The non-transitory computer-readable medium of any of clauses 40-50, further comprises instructions to:

receive, from the second UE via a physical sidelink shared channel (PSSCH), a first data communication;

wherein the instructions to send the indication comprise further instructions to send, in response to a failure to decode the first data communication, a request to a network device to forward one or more physical layer capabilities of the first UE to the second UE, the request comprising a first identification of the first UE and a second identification of the second UE; and receive, from the second UE, a second data communication configured according to the one or more physical layer capabilities of the first UE.

52. The non-transitory computer-readable medium of clause 51, wherein the first identification and the second identification comprise at least one of a medium access control (MAC) layer identification, a radio link control (RLC) layer identification, a packet data convergence control (PDCP) layer identification, a non-access stratum (NAS) layer identification, an internet protocol (IP) layer identification, an application layer identification, and a mapping between the first identification and the second identification to a cell radio network temporary identifier (C-RNTI).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a first user equipment (UE), comprising:
   receiving, from a second UE via a physical sidelink shared channel (PSSCH), a first data communication;
   sending, to the second UE, an indication indicating a UE type for sidelink communication,
      wherein sending the indication comprises sending, in response to a failure to decode the first data communication, a request to a network device to forward one or more physical layer capabilities of the first UE to the second UE, the request comprising a first identification of the first UE and a second identification of the second UE;
   performing sidelink communications with the second UE in accordance with the indicated UE type; and
   receiving, from the second UE, a second data communication configured according to the one or more physical layer capabilities of the first UE.

2. The method of claim 1, wherein:
   the first UE is a reduced capability UE (RedCap UE) device;
   the second UE is a non-RedCap UE device; and
   the indication indicating the UE type comprises indicating the first UE as the RedCap UE device.

3. The method of claim 1, wherein sending the indication comprises:
   sending, to the second UE, a synchronization signal block (SSB) comprising the indication indicating the UE type for the sidelink communication.

4. The method of claim 1, further comprising:
   receiving, from the second UE, a UE capability request; and
   wherein sending the indication comprises sending, to the second UE in response to the UE capability request, UE capability information indicating at least one reduced capability of the first UE.

5. The method of claim 1, wherein:
   sending the indication comprises sending, to the second UE, a discovery message comprising the indication indicating the UE type for the sidelink communication; and
   the method further comprises receiving, from the second UE in response to the discovery message, a connection request.

6. The method of claim 1, further comprising:
   receiving, from the second UE via the PSSCH, a data communication; and
   wherein sending the indication comprises sending, via a physical sidelink feedback channel (PSFCH), the indication indicating the UE type for the sidelink communication.

7. The method of claim 6, wherein sending, via the PSFCH, the indication comprises:
   determining a resource from PSFCH resources to send, via the PSFCH, the indication indicating the UE type for the sidelink communication based on at least one of:
   a starting sub-channel of the PSSCH;
   a slot index of the PSSCH;
   a source identification of a sidelink communication link;
   a destination identification of the sidelink communication link; or
   a combination of thereof.

8. The method of claim 6, further comprising:
   sending, via the PSFCH, a hybrid automatic repeat request acknowledgement (HARQ-ACK) feedback for the data communication, wherein first PSFCH resources for sending the HARQ-ACK feedback are separately configured from second PSFCH resources for indicating the UE type for the sidelink communication.

9. The method of claim 6, further comprising:

receiving, from the second UE, a sidelink control information (SCI) enabling indicating the UE type for the sidelink communication, the SCI scheduling the data communication; and wherein sending the indication comprises sending, via the PSSCH, one or more physical layer capabilities of the first UE.

10. The method of claim 6, wherein sending the indication comprises:

accessing a mapping relationship between a plurality of cyclic shift sequences associated with the PSFCH and one or more physical layer capabilities of the first UE.

11. The method of claim 10, wherein the one or more physical layer capabilities of the first UE comprises at least one of:

a maximum bandwidth information;

a maximum modulation order;

a quantity of multiple-input multiple-output (MIMO) spatial layers; and a combination of thereof.

12. The method of claim 1, wherein the first identification and the second identification comprise at least one of a medium access control (MAC) layer identification, a radio link control (RLC) layer identification, a packet data convergence control (PDCP) layer identification, a non-access stratum (NAS) layer identification, an internet protocol (IP) layer identification, an application layer identification, or a mapping between the first identification and the second identification to a cell radio network temporary identifier (C-RNTI).

13. An apparatus for wireless communication by a first user equipment (UE), comprising:

a memory; and a processor communicatively coupled with the memory and configured to:

receive, from a second UE via a physical sidelink shared channel (PSSCH), a first data communication;

send, to the second UE, an indication indicating a UE type for sidelink communication, wherein to send the indication comprises to send, in response to a failure to decode the first data communication, a request to a network device to forward one or more physical layer capabilities of the first UE to the second UE, the request comprising a first identification of the first UE and a second identification of the second UE;

perform sidelink communications with the second UE in accordance with the indicated UE type; and receive, from the second UE, a second data communication configured according to the one or more physical layer capabilities of the first UE.

14. The apparatus of claim 13, wherein:

the first UE is a reduced capability UE (RedCap UE) device;

the second UE is a non-RedCap UE device; and the indication indicating the UE type comprises indicating the first UE as the RedCap UE device.

15. The apparatus of claim 13, wherein to send the indication comprises to:

send, to the second UE, a synchronization signal block (SSB) comprising the indication indicating the UE type for the sidelink communication.

16. The apparatus of claim 13, wherein the processor is further configured to:

receive, from the second UE, a UE capability request; and wherein to send the indication comprises to send, to the second UE in response to the UE capability request, UE capability information indicating at least one reduced capability of the first UE.

17. The apparatus of claim 13, wherein:

to send the indication comprises to send, to the second UE, a discovery message comprising the indication indicating the UE type for the sidelink communication; and the processor is further configured to receive, from the second UE in response to the discovery message, a connection request.

18. The apparatus of claim 13, wherein the processor is further configured to:

receive, from the second UE via the PSSCH, a data communication; and wherein to send the indication comprises to send, via a physical sidelink feedback channel (PSFCH), the indication indicating the UE type for the sidelink communication.

19. The apparatus of claim 18, wherein to send, via the PSFCH, the indication comprises to:

determine a resource from PSFCH resources to send, via the PSFCH, the indication indicating the UE type for the sidelink communication based on at least one of:

a starting sub-channel of the PSSCH;

a slot index of the PSSCH;

a source identification of a sidelink communication link;

a destination identification of the sidelink communication link; or a combination of thereof.

20. The apparatus of claim 18, wherein the processor is further configured to:

send, via the PSFCH, a hybrid automatic repeat request acknowledgement (HARQ-ACK) feedback for the data communication, wherein first PSFCH resources for sending the HARQ-ACK feedback are separately configured from second PSFCH resources for indicating the UE type for the sidelink communication.

21. The apparatus of claim 18, wherein the processor is further configured to:

receive, from the second UE, a sidelink control information (SCI) enabling indicating the UE type for the sidelink communication, the SCI scheduling the data communication; and wherein to send the indication comprises to send, via the PSSCH, one or more physical layer capabilities of the first UE.

22. The apparatus of claim 18, wherein to send the indication comprises to:

access a mapping relationship between a plurality of cyclic shift sequences associated with the PSFCH and one or more physical layer capabilities of the first UE.

23. The apparatus of claim 22, wherein the one or more physical layer capabilities of the first UE comprises at least one of:

a maximum bandwidth information;

a maximum modulation order;

a quantity of multiple-input multiple-output (MIMO) spatial layers; and a combination of thereof.

24. The apparatus of claim 13, wherein the first identification and the second identification comprise at least one of a medium access control (MAC) layer identification, a radio link control (RLC) layer identification, a packet data convergence control (PDCP) layer identification, a non-access stratum (NAS) layer identification, an internet protocol (IP) layer identification, an application layer identification, or a mapping between the first identification and the second identification to a cell radio network temporary identifier (C-RNTI).

25. An apparatus for wireless communication by a first user equipment (UE), comprising:

means for receiving, from a second UE via a physical sidelink shared channel (PSSCH), a first data communication;

means for sending, to the second UE, an indication indicating a UE type for sidelink communication, wherein the means for sending the indication comprises means for sending, in response to a failure to decode the first data communication, a request to a network device to forward one or more physical layer capabilities of the first UE to the second UE, the request comprising a first identification of the first UE and a second identification of the second UE;

means for performing sidelink communications with the second UE in accordance with the indicated UE type; and means for receiving, from the second UE, a second data communication configured according to the one or more physical layer capabilities of the first UE.

26. The apparatus of claim 25, wherein the means for sending the indication comprises means for sending, to the second UE, a discovery message comprising the indication indicating the UE type for the sidelink communication; and wherein the apparatus further comprises means for receiving, from the second UE in response to the discovery message, a connection request.

27. A non-transitory computer-readable medium comprising stored instructions for wireless communication by a first user equipment (UE), executable by a processor to:

receive, from a second UE via a physical sidelink shared channel (PSSCH), a first data communication;

send, to the second UE, an indication indicating a UE type for sidelink communication, wherein to send the indication comprises to send, in response to a failure to decode the first data communication, a request to a network device to forward one or more physical layer capabilities of the first UE to the second UE, the request comprising a first identification of the first UE and a second identification of the second UE;

perform sidelink communications with the second UE in accordance with the indicated UE type; and receive, from the second UE, a second data communication configured according to the one or more physical layer capabilities of the first UE.

28. The non-transitory computer-readable medium of claim 27, wherein to send the indication comprises to send, to the second UE, a discovery message comprising the indication indicating the UE type for the sidelink communication; and wherein the processor is further configured to receive, from the second UE in response to the discovery message, a connection request.

* * * * *